United States Patent
Tomi

(10) Patent No.: US 7,718,233 B2
(45) Date of Patent: *May 18, 2010

(54) LIQUID CRYSTAL COMPOSITION AND LIQUID CRYSTAL DISPLAY ELEMENT

(75) Inventor: Yoshitaka Tomi, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/557,331

(22) Filed: Sep. 10, 2009

(65) Prior Publication Data

US 2009/0321684 A1    Dec. 31, 2009

Related U.S. Application Data

(62) Division of application No. 11/242,663, filed on Oct. 3, 2005, now Pat. No. 7,638,174.

(30) Foreign Application Priority Data

Oct. 4, 2004    (JP) .............. 2004-291571
Dec. 16, 2004    (JP) .............. 2004-364424

(51) Int. Cl.
    *C09K 19/30*    (2006.01)
    *C09K 19/12*    (2006.01)
(52) U.S. Cl. .............. 428/1.1; 252/299.63; 252/299.66
(58) Field of Classification Search ............ 252/299.63, 252/299.66; 428/1.1
    See application file for complete search history.

(56) References Cited

U.S. PATENT DOCUMENTS

| | | | |
|---|---|---|---|
| 7,435,457 B2 * | 10/2008 | Goto et al. ................... | 428/1.1 |
| 7,435,459 B2 * | 10/2008 | Yanai et al. ................... | 428/1.1 |
| 7,435,460 B2 * | 10/2008 | Yanai et al. ................... | 428/1.1 |
| 7,470,456 B2 * | 12/2008 | Yanai et al. ................... | 428/1.1 |
| 7,485,351 B2 * | 2/2009 | Saito ........................... | 428/1.1 |
| 7,579,053 B2 * | 8/2009 | Czanta et al. ................. | 428/1.1 |
| 7,582,338 B2 * | 9/2009 | Ichinose et al. .............. | 428/1.1 |
| 7,595,101 B2 * | 9/2009 | Wittek et al. ................. | 428/1.1 |
| 7,597,944 B2 * | 10/2009 | Fujita ......................... | 428/1.1 |
| 7,625,610 B2 * | 12/2009 | Saito et al. ................... | 428/1.1 |
| 7,638,174 B2 * | 12/2009 | Tomi .......................... | 428/1.1 |
| 2006/0278850 A1 * | 12/2006 | Czanta et al. ........... | 252/299.61 |
| 2007/0018136 A1 * | 1/2007 | Goto et al. ............. | 252/299.63 |
| 2008/0099726 A1 * | 5/2008 | Kubo .................... | 252/299.63 |
| 2008/0246001 A1 * | 10/2008 | Hiroaki ................. | 252/299.61 |
| 2009/0091703 A1 * | 4/2009 | Matsumura et al. ......... | 349/186 |

* cited by examiner

*Primary Examiner*—Shean C Wu
(74) *Attorney, Agent, or Firm*—J.C. Patents

(57) ABSTRACT

The liquid crystal composition includes at least one compound selected from a group of compounds represented by formula (1) as a first component, has a positive dielectric anisotropy, and has a nematic phase, and a liquid crystal display element containing the composition:

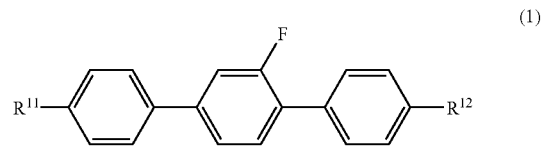

(1)

wherein $R^{11}$ and $R^{12}$ are alkyls having different carbon numbers.

10 Claims, No Drawings

US 7,718,233 B2

LIQUID CRYSTAL COMPOSITION AND LIQUID CRYSTAL DISPLAY ELEMENT

CROSS-REFERENCE TO RELATED APPLICATION

This application is a divisional application of, and claims the priority benefit of, U.S. application Ser. No. 11/242,663 filed on Oct. 3, 2005 which claims priority to Japanese Patent Application No. 2004-291571, filed on Oct. 4, 2004 and Japanese Patent Application No. 2004-364424, filed on Dec. 16, 2004.

BACKGROUND OF THE INVENTION

1. Field of the Invention

The invention relates to a liquid crystal composition suitable for use in an active matrix (AM) element, and an AM element including the composition. In particular, the invention relates mainly to a composition having a nematic phase and a composition having a positive dielectric anisotropy.

2. Related Art

On a liquid crystal display element, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment and so forth. Classification based on a driving mode includes a passive matrix (PM) and an active matrix (AM). PM is further classified into static, multiplex and so forth, and AM is classified into a thin film transistor (TFT), a metal insular metal (MIM) and so forth. TFT is further classified into amorphous silicon and polycrystal silicon. The latter is classified into a high temperature type and a low temperature type according to a production process. Classification based on a light source is a reflection type utilizing a natural light, a transmission type utilizing a backlight and a semi-transmission type utilizing both the natural light and the backlight.

These elements include a liquid crystal composition having suitable characteristics. The liquid crystal composition has a nematic phase. General characteristics of the composition should be improved to obtain an AM element having good general characteristics. Table 1 below summarizes a relationship between the two general characteristics. The general characteristics of the composition will be explained further based on a commercially available AM element. A temperature range of a nematic phase relates to the temperature range in which the element can be used. A desirable range at a higher limit temperature of the nematic phase is approximately 70° C. or more and a desirable range at a lower limit temperature is approximately −20° C. or less. The viscosity of the composition relates to the response time of the element. A short response time is desirable for displaying a moving image. Accordingly, a small viscosity of the composition is desirable. A small viscosity at a low temperature is more desirable.

TABLE 1

General characteristics of a liquid crystal composition and an AM element

| No | General characteristics of a composition | General characteristics of an AM Element |
|---|---|---|
| 1 | Temperature range of a nematic phase is wide | Usable temperature range is wide |
| 2 | Viscosity is small[1)] | Response time is short |
| 3 | Optical anisotropy is suitable | Contrast ratio is large |
| 4 | Threshold voltage is low | Electric power consumption is small and a contrast ratio is large |
| 5 | Specific resistance is large | Voltage holding ratio is large and a contrast ratio is large |

Note
[1)]A liquid crystal composition can be injected into a cell in a short time.

The optical anisotropy of the composition relates to the contrast ratio of the element. A product ($\Delta n \cdot d$) of the optical anisotropy ($\Delta n$) of the composition and the cell gap (d) of the element is designed to be approximately 0.45 micrometers to maximize the contrast ratio of the element. Accordingly, the optical anisotropy of the composition is in the range from approximately 0.08 to approximately 0.12. In recent years, $\Delta n \cdot d$ is designed to be from approximately 0.38 to approximately 0.42 micrometers to decrease the response time of the device. In this case, the optical anisotropy of the composition is in the range from approximately 0.10 to approximately 0.15. A low threshold voltage in the composition contributes to a small electric power consumption and a large contrast ratio of the element. Accordingly, a low threshold voltage is desirable. A large specific resistance of the composition contributes to a large voltage holding ratio and a large contrast ratio of the element. Accordingly, a composition having a large specific resistance not only room temperature but also high temperature in the initial stage is desirable. A composition having a large specific resistance not only room temperature but also high temperature even after it has been used for a long time is desirable.

The conventional compositions are disclosed in the following documents. JP S60-51135 A/1985 (U.S. Pat. No. 4,594,465, EP 0 132 377A2), JP H01-500860 T/1989 (WO88/02130A2), JP H01-503455 T/1989 (WO87/07890A2), JP H04-279695 A/1992, JP H09-183974 A/1997 (GB 2 300 642 A), JP H10-501019 T/1998 (WO95/33802A1), and WO 2004/035710/2004. JP H01-503455 T/1989 (WO87/07890A2), JP H04-279695 A/1992 and JP H10-501019 T/1998 (WO95/33802A1) relate to a ferroelectric liquid crystal composition (a composition containing a smectic phase). JP H01-500860 T/1989 (WO88/02130A2) and JP H09-183974 A/1997 (GB 2 300 642 A) relate to a liquid crystal composition containing a nematic phase and having a negative dielectric anisotropy. On the other hand, JP S60-51135A/1985 (U.S. Pat. No. 4,594,465, EP 0 132 377A2) and WO 2004/035710/2004 relate to a liquid crystal composition containing a nematic phase having a positive dielectric anisotropy.

A desirable AM element has such characteristics as a large usable temperature range, a short response time and a large contrast ratio. The response time is desirably as shorter by 1 msec as possible. Therefore, a composition having such characteristics as a high higher limit temperature of the nematic phase, a low lower limit temperature of the nematic phase, a small viscosity, a suitable optical anisotropy, a low threshold voltage and a large specific resistance is desirable.

SUMMARY OF THE INVENTION

The invention relates to a liquid crystal composition including at least one compound selected from a group of compounds represented by formula (1) as a first component, having a positive dielectric anisotropy, and having a nematic phase, and a liquid crystal display element containing the composition:

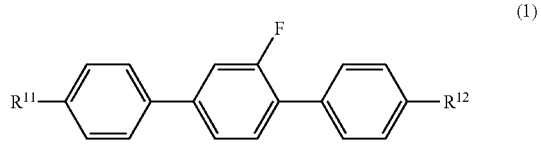

(1)

wherein $R^{11}$ and $R^{12}$ are alkyls having different carbon numbers.

The invention also has a liquid crystal display element including the liquid crystal composition described above.

DETAILED DESCRIPTION OF THE INVENTION

The composition of the invention satisfies many characteristics among the characteristics such as a high higher limit temperature of the nematic phase, a low lower limit temperature of the nematic phase, a small viscosity, a suitable optical anisotropy, a low threshold voltage and a large specific resistance. The composition is properly balanced regarding many characteristics. The element of the inventions includes such a composition. The element including a composition with a small viscosity, an optical anisotropy ranging from approximately 0.10 to approximately 0.15 and a low threshold voltage has a short response time and a large voltage holding ratio, and is suitable as an AM element. The element has a short response time.

Terms used in the specification and claims are defined as follows: The liquid crystal composition of the invention or the liquid crystal display element of the invention may occasionally be abbreviated as "the composition" or "the element", respectively. A liquid crystal display element is a general term for a liquid crystal display panel and a liquid crystal display module. A "liquid crystalline compound" is a general term for a compound having a liquid crystal phase such as a nematic phase at 25° C., a smectic phase at 25° C. and so forth, and a general term for a compound having no liquid crystal phase at 25° C. and being useful as a component of the composition. Optically active compounds are not included in the liquid crystalline compound. At least one compound selected from a group of compounds represented by formula (1) may be abbreviated as "the compound (1)". A group of compounds represented by formula (1) may also be abbreviated as "the compound (1)". The compounds represented by any other formula may also be abbreviated in the same manner.

The language in formula (1) "$R^{11}$ and $R^{12}$ are alkyls having different carbon numbers" means that $R^{11}$ and $R^{12}$ in formula (1) are alkyls that necessarily have carbon numbers different from each other. For example, in the case where two compound (1) are contained as components of the composition, one of the compounds (1) has $R^{11}$ and $R^{12}$ of having different carbon numbers. The other of the compounds (1) also has $R^{11}$ and $R^{12}$ of having different carbon numbers.

The language "at least one compound selected from a group of compounds represented by formula (1)" means that at least one of the compounds (1) is selected as a component of the composition. Two or more of the compounds (1) may be selected. This is the same as in the other formulae.

The language "at least one compound selected from a group of compounds represented by formulae (2) to (7)" means that at least one of the compounds (2) to (7) is mixed. Two or more of the compounds of one of the compounds represented by formulae (2) to (7) may be selected as components of the composition. Two or more of the compounds of plurality of formulae (2) to (7) may also be selected as components of the composition. This is the same as in the other formulae.

The language "the content of the first component" means, in the case where the first component is a single compound, the content of the compound. In the case where the first component includes two or more compounds, it means the total content of the compounds constituting the first component. This is the same as in the language "the content of the second component" and the like.

The language "the second component is at least one compound selected from a group of compounds represented by formula (2)" means that only the compound (2) is selected as the second component, and the second component does not contain other compounds than the compound (2). This is the same as in the third component and the like.

The language "a group of compounds represented by formula (1)" means, in the case where the compound (1) is a single compound, the compound itself. In the case where the compound (1) includes two or more compounds, it means all the two or more of the compounds (1). This is the same as in the other formulae.

A higher limit temperature of a nematic phase may be abbreviated as "a higher limit temperature". A lower limit temperature of a nematic phase may be abbreviated to "a lower limit temperature". "A specific resistance is large" means that a composition has a large specific resistance at not only room temperature but also high temperatures at the initial stage, and the composition has a large specific resistance at not only room temperature but also high temperatures even after it has been used for a long time. "A voltage holding ratio is large" means that a element has a large voltage holding ratio at not only room temperature but also high temperatures at the initial stage and the element has a large voltage holding ratio at not only room temperature but also high temperatures even after it has been used for a long time. When characteristics such as optical anisotropy and so forth are explained, values measured by means of the method described in the Examples are used. The content (percentage) of a component compound or a liquid crystalline compound means the percentage by weight (% by weight) based on the total weight of the liquid crystalline compound.

An advantage of the invention is to provide a liquid crystal composition which satisfies many characteristics among the characteristics such as a high higher limit temperature of the nematic phase, a low lower limit temperature of the nematic phase, a small viscosity, a suitable optical anisotropy, a low threshold voltage and a large specific resistance. One aspect of the invention is also to provide a liquid crystal composition properly balanced regarding many characteristics. Another aspect of the invention is also to provide a liquid crystal display element including such a composition. A further aspect of the invention is to provide an AM element including a composition with a small viscosity, an optical anisotropy ranging from approximately 0.10 to approximately 0.15 and a low threshold voltage, and having a short response time and a large voltage holding ratio. Among these, an important characteristic feature is a short response time.

The invention includes the following.

1. A liquid crystal composition including at least one compound selected from a group of compounds represented by formula (1) as the first component, having a positive dielectric anisotropy, and having a nematic phase:

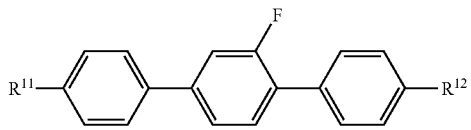

(1)

wherein $R^{11}$ and $R^{12}$ are alkyls having different carbon numbers.

2. The liquid crystal composition according to item 1, wherein a ratio of the first component is in a range of from approximately 3% to approximately 50% by weight.

3. The liquid crystal composition according to item 1, wherein a ratio of the first component is in a range of approximately 3% by weight or more and less than approximately 10% by weight.

4. The liquid crystal composition according to item 1, wherein a ratio of the first component is in a range of from approximately 10% to approximately 50% by weight.

5. A liquid crystal composition comprising at least one compound selected from a group of compounds represented by formula (1) as a first component and at least one compound selected from a group of compounds represented by formulae (2) to (7) as an another component, having a positive dielectric anisotropy, and having a nematic phase:

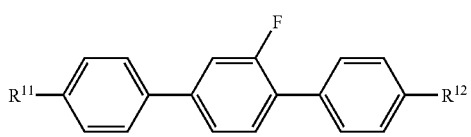

(1)

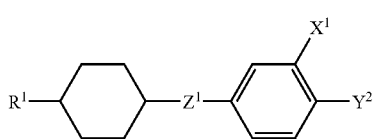

(2)

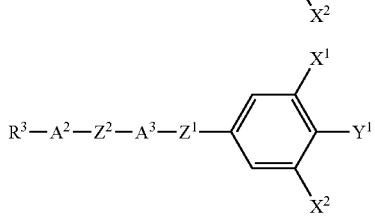

(3)

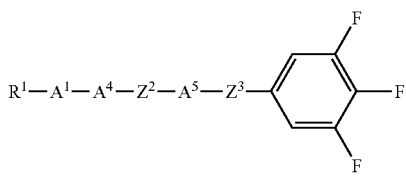

(4)

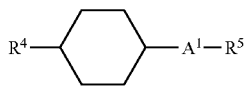

(5)

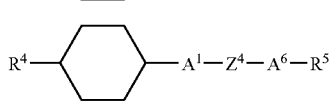

(6)

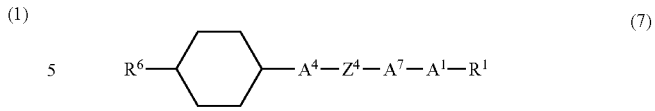

(7)

wherein $R^1$ is alkyl; $R^3$ is alkyl or alkenyl; $R^4$ is alkyl, alkenyl or alkenyl having arbitrary hydrogen substituted by fluorine; $R^5$ is alkyl or alkoxy; $R^6$ is alkyl or alkoxymethyl; $R^{11}$ and $R^{12}$ are alkyls having different carbon numbers; $A^1$ and $A^6$ are independently 1,4-cyclohexylene or 1,4-phenylene; $A^2$ is 1,4-cyclohexylene, 1,3-dioxane-2,5-diyl or 1,4-phenylene; $A^3$ is 1,4-cyclohexylene, 1,3-dioxane-2,5-diyl, 1,4-phenylene, 2-fluoro-1,4-phenylene or 2,6-difluoro-1,4-phenylene; $A^4$ is 1,4-cyclohexylene, 1,4-phenylene or 2-fluoro-1,4-phenylene; $A^5$ is 1,4-phenylene, 2-fluoro-1,4-phenylene or 2,6-difluoro-1,4-phenylene; $A^7$ is 1,4-phenylene or 2-fluoro-1,4-phenylene; $Z^1$ is a single bond, —$(CH_2)_2$—, —$CF_2O$— or —COO—; $Z^2$ is a single bond or —$(CH_2)_2$—; $Z^3$ is a single bond or —$CF_2O$—; $Z^4$ is a single bond or —COO—; $X^1$ and $X^2$ are independently hydrogen or fluorine; $Y^1$ is fluorine, chlorine, —$OCF_3$ or —$OCF_2H$; and $Y^2$ is fluorine or chlorine.

6. The liquid crystal composition according to item 5, wherein a ratio of the first component is in a range of from approximately 3% to approximately 50% by weight.

7. The liquid crystal composition according to item 5, wherein a ratio of the first component is in a range of approximately 3% by weight or more and less than approximately 10% by weight.

8. The liquid crystal composition according to item 5, wherein a ratio of the first component is in a range of from approximately 10% to approximately 50% by weight.

9. The liquid crystal composition according to one of items 1 to 8, wherein the composition has an optical anisotropy ranging from approximately 0.10 to approximately 0.15.

10. A liquid crystal composition comprising at least one compound selected from a group of compounds represented by formula (1) as a first component, at least one compound selected from a group of compounds represented by formulae (2) to (4) as a second component and at least one compound selected from a group of compounds represented by formulae (5) to (7) as a third component, having a positive dielectric anisotropy, and having a nematic phase:

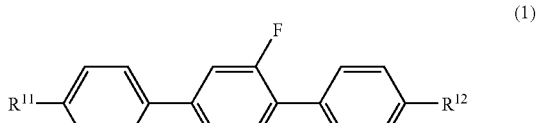

(1)

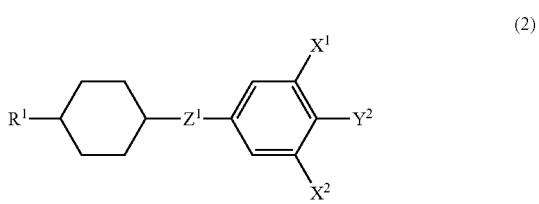

(2)

-continued

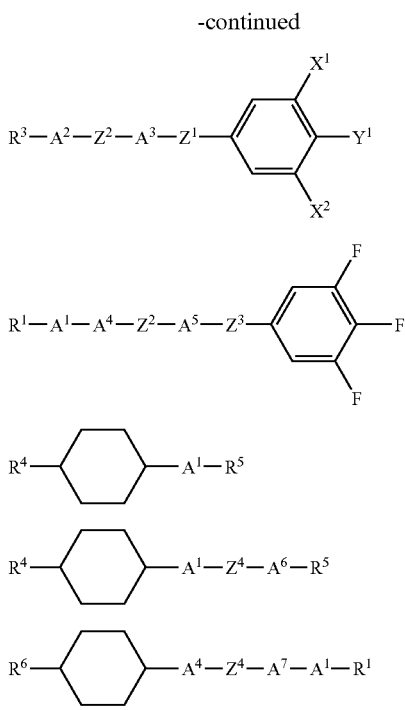

(3)

(4)

(5)

(6)

(7)

wherein $R^1$ is alkyl; $R^3$ is alkyl or alkenyl; $R^4$ is alkyl, alkenyl or alkenyl having arbitrary hydrogen substituted by fluorine; $R^5$ is alkyl or alkoxy; $R^6$ is alkyl or alkoxymethyl; $R^{11}$ and $R^{12}$ are alkyls having different carbon numbers; $A^1$ and $A^6$ are independently 1,4-cyclohexylene or 1,4-phenylene; $A^2$ is 1,4-cyclohexylene, 1,3-dioxane-2,5-diyl or 1,4-phenylene; $A^3$ is 1,4-cyclohexylene, 1,3-dioxane-2,5-diyl, 1,4-phenylene, 2-fluoro-1,4-phenylene or 2,6-difluoro-1,4-phenylene; $A^4$ is 1,4-cyclohexylene, 1,4-phenylene or 2-fluoro-1,4-phenylene; $A^5$ is 1,4-phenylene, 2-fluoro-1,4-phenylene or 2,6-difluoro-1,4-phenylene; $A^7$ is 1,4-phenylene or 2-fluoro-1,4-phenylene; $Z^1$ is a single bond, —($CH_2$)$_2$—, —$CF_2O$— or —COO—; $Z^2$ is a single bond or —($CH_2$)$_2$—; $Z^3$ is a single bond or —$CF_2O$—; $Z^4$ is a single bond or —COO—; $X^1$ and $X^2$ are independently hydrogen or fluorine; $Y^1$ is fluorine, chlorine, —$OCF_3$ or —$OCF_2H$; and $Y^2$ is fluorine or chlorine.

11. The liquid crystal composition according to item 10, wherein the second component is at least one compound selected from a group of compounds represented by formula (2).

12. The liquid crystal composition according to item 10, wherein the second component is at least one compound selected from a group of compounds represented by formula (3).

13. The liquid crystal composition according to item 10, wherein the second component is at least one compound selected from a group of compounds represented by formula (4).

14. The liquid crystal composition according to item 10, wherein the second component is at least one compound selected from a group of compounds represented by formula (2) and at least one compound selected from a group of compounds represented by formula (3).

15. The liquid crystal composition according to item 10, wherein the second component is at least one compound selected from a group of compounds represented by formula (3) and at least one compound selected from a group of compounds represented by formula (4).

16. The liquid crystal composition according to item 10, wherein the second component is at least one compound selected from a group of compounds represented by formula (2), at least one compound selected from a group of compounds represented by formula (3) and at least one compound selected from a group of compounds represented by formula (4).

17. The liquid crystal composition according to one of items 10 to 16, wherein the third component is at least one compound selected from a group of compounds represented by formula (5).

18. The liquid crystal composition according to one of items 10 to 16, wherein the third component is at least one compound selected from a group of compounds represented by formula (6).

19. The liquid crystal composition according to one of items 10 to 16, wherein the third component is at least one compound selected from a group of compounds represented by formula (7).

20. The liquid crystal composition according to one of items 10 to 16, wherein the third component is at least one compound selected from a group of compounds represented by formula (5) and at least one compound selected from a group of compounds represented by formula (6).

21. The liquid crystal composition according to one of items 10 to 16, wherein the third component is at least one compound selected from a group of compounds represented by formula (5), at least one compound selected from a group of compounds represented by formula (6) and at least one compound selected from a group of compounds represented by formula (7).

22. The liquid crystal composition according to one of items 10 to 21, wherein a ratio of the first component is in a range of from approximately 3% to approximately 50% by weight, a ratio of the second component is in a range of from approximately 10% to approximately 85% by weight, and a ratio of third component is in a range of from approximately 10% to approximately 80% by weight.

23. The liquid crystal composition according to one of items 10 to 21, wherein a ratio of the first component is in a range of approximately 3% by weight or more and less than approximately 10% by weight, a ratio of the second component is in a range of from approximately 10% to approximately 85% by weight, and a ratio of third component is in a range of from approximately 10% to approximately 80% by weight.

24. The liquid crystal composition according to one of items 10 to 21, wherein a ratio of the first component is in a range of from approximately 10% to approximately 50% by weight, a ratio of the second component is in a range of from approximately 10% to approximately 85% by weight, and a ratio of third component is in a range of from approximately 10% to approximately 80% by weight.

25. The liquid crystal composition according to one of items 10 to 24, wherein the composition has an optical anisotropy ranging from approximately 0.10 to approximately 0.15.

26. A liquid crystal composition comprising at least one compound selected from a group of compounds represented by formula (1) as a first component, at least one compound selected from a group of compounds represented by formulae (2-1), (3-1) to (3-6) and (4-1) as a second component and at least one compound selected from a group of compounds represented by formulae (5-1), (5-2), (6-1), (6-2) and (7-1) as a third component, having a positive dielectric anisotropy, and having a nematic phase:

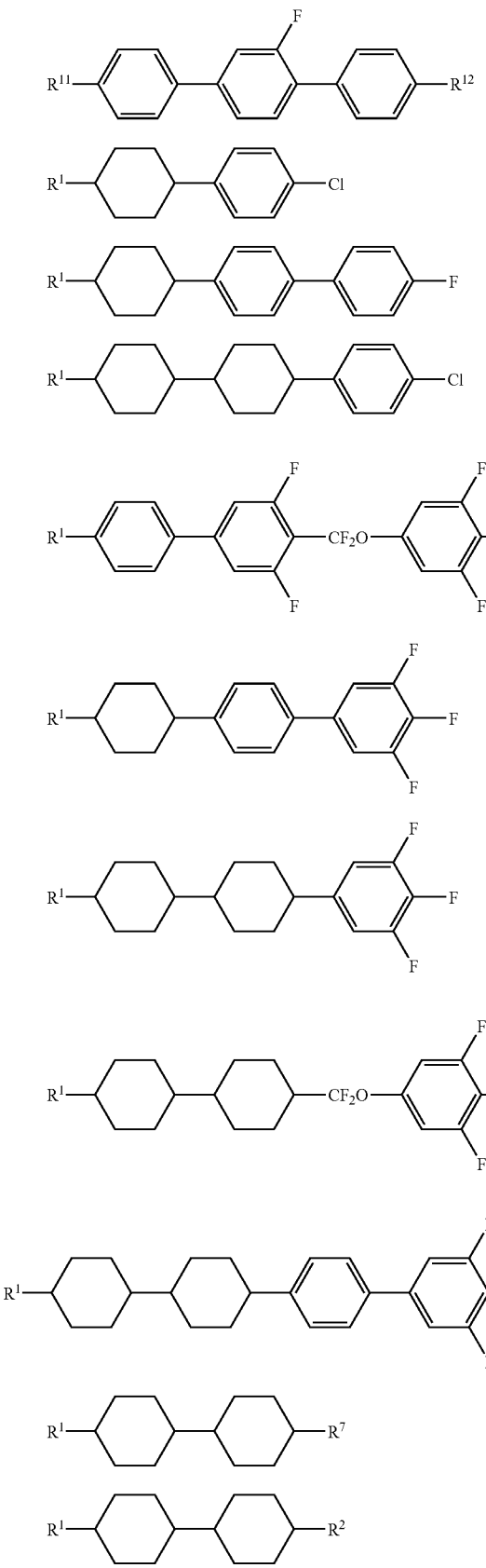

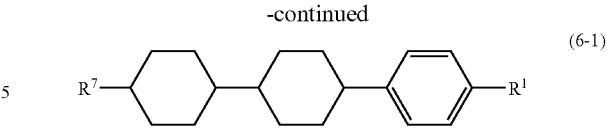

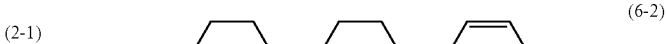

wherein $R^1$ and $R^2$ are independently alkyl; $R^7$ is alkenyl; and $R^{11}$ and $R^{12}$ are alkyls having different carbon numbers.

27. The liquid crystal composition according to item 26, wherein the second component is at least one compound selected from a group of compounds represented by formulae (3-3) to (3-6), and the third component is at least one compound selected from a group of compounds represented by formulas (5-1), (5-2), (6-1) and (6-2).

28. The liquid crystal composition according to item 26 or 27, wherein a ratio of the first component is in a range of from approximately 3% to approximately 50% by weight, a ratio of the second component is in a range of from approximately 10% to approximately 85% by weight, and a ratio of third component is in a range of from approximately 10% to approximately 80% by weight.

29. The liquid crystal composition according to item 26 or 27, wherein a ratio of the first component is in a range of approximately 3% by weight or more and less than approximately 10% by weight, a ratio of the second component is in a range of from approximately 10% to approximately 85% by weight, and a ratio of third component is in a range of from approximately 10% to approximately 80% by weight.

30. The liquid crystal composition according to item 26 or 27, wherein a ratio of the first component is in a range of from approximately 10% to approximately 50% by weight, a ratio of the second component is in a range of from approximately 10% to approximately 85% by weight, and a ratio of third component is in a range of from approximately 10% to approximately 80% by weight.

31. The liquid crystal composition according to one of items 26 to 30, wherein the composition has an optical anisotropy ranging from approximately 0.10 to approximately 0.15.

32. A liquid crystal composition comprising at least one compound selected from a group of compounds represented by formula (1) as a first component, at least one compound selected from a group of compounds represented by formula (3-3) as a second component, and at least one compound selected from a group of compounds represented by formula (5-1) and at least one compound selected from a group of compounds represented by formulae (6-1) and (6-2) as a third component, having a positive dielectric anisotropy, and having a nematic phase:

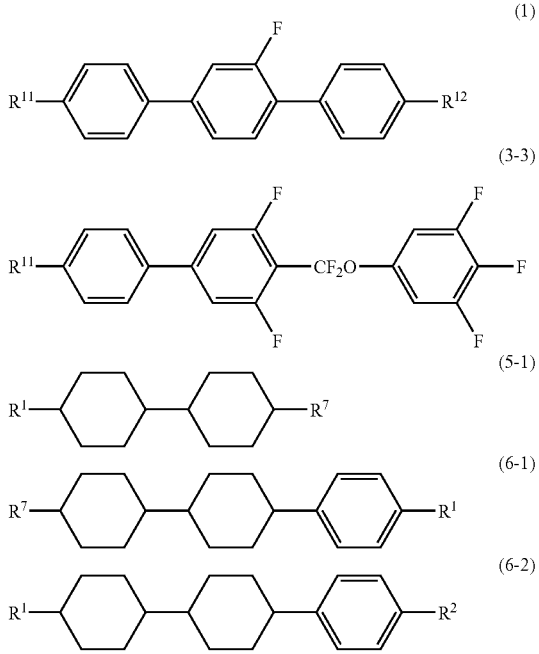

wherein $R^1$ and $R^2$ are independently alkyl; $R^7$ is alkenyl; and $R^{11}$ and $R^{12}$ are alkyls having different carbon numbers.

33. The liquid crystal composition according to item 32, wherein a ratio of the first component is in a range of from approximately 3% to approximately 50% by weight, a ratio of the compound represented by formula (3-3) as the second component is in a range of from approximately 3% to approximately 40% by weight, a ratio of the compound represented by formula (5-1) as the third component is in a range of from approximately 11% to approximately 50% by weight, and a ratio of the compound represented by formulae (6-1) and (6-2) as the third component is in a range of from approximately 3% to approximately 45% by weight.

34. The liquid crystal composition according to item 32, wherein a ratio of the first component is in a range of approximately 3% by weight or more and less than approximately 10% by weight, a ratio of the compound represented by formula (3-3) as the second component is in a range of from approximately 3% to approximately 40% by weight, a ratio of the compound represented by formula (5-1) as the third component is in a range of from approximately 11% to approximately 50% by weight, and a ratio of the compound represented by formulae (6-1) and (6-2) as the third component is in a range of from approximately 3% to approximately 45% by weight.

35. The liquid crystal composition according to item 32, wherein a ratio of the first component is in a range of from approximately 10% to approximately 50% by weight, a ratio of the compound represented by formula (3-3) as the second component is in a range of from approximately 3% to approximately 40% by weight, a ratio of the compound represented by formula (5-1) as the third component is in a range of from approximately 11% to approximately 50% by weight, and a ratio of the compound represented by formulae (6-1) and (6-2) as the third component is in a range of from approximately 3% to approximately 45% by weight.

36. The liquid crystal composition according to one of items 32 to 35, wherein the composition further comprises at least one compound selected from a group of compounds represented by formula (3-1) as the second component:

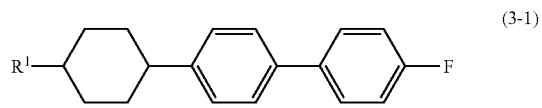

wherein $R^1$ is alkyl.

37. The liquid crystal composition according to item 36, wherein the composition further comprises at least one compound selected from a group of compounds represented by formula (2-1) as the second component:

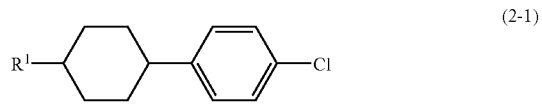

wherein $R^1$ is alkyl.

38. The liquid crystal composition according to item 37, wherein the composition further comprises at least one compound selected from a group of compounds represented by formula (3-2) as the second component:

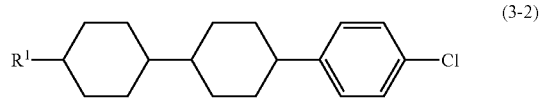

wherein $R^1$ is alkyl.

39. The liquid crystal composition according to item 36, wherein the composition further comprises at least one compound selected from a group of compounds represented by formula (2-1) and at least one compound selected from a group of compounds represented by formulae (3-4), (3-5) and (3-6) as the second component:

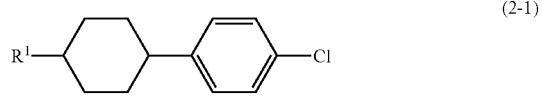

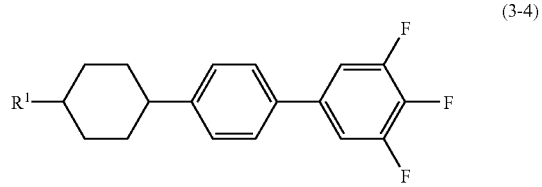

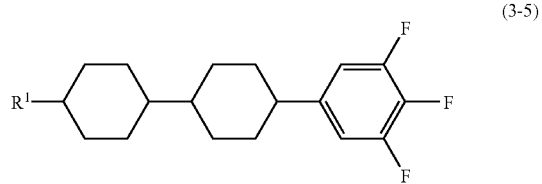

-continued

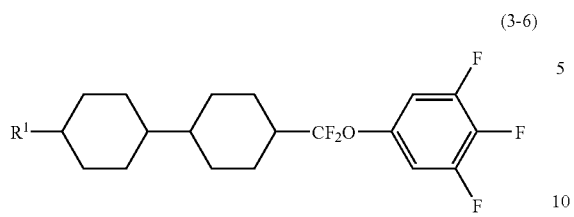
(3-6)

wherein R¹ is alkyl.

40. The liquid crystal composition according to item 39, wherein the composition further comprises at least one compound selected from a group of compounds represented by formula (7-1) as the third component:

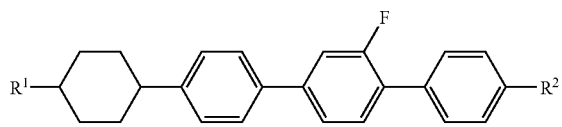
(7-1)

wherein R¹ and R² are independently alkyl.

41. The liquid crystal composition according to one of items 32 to 35, wherein the composition further comprises at least one compound selected from a group of compounds represented by formula (2-1) as the second component:

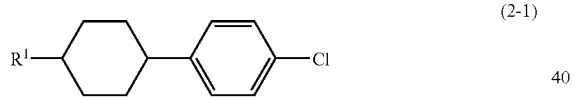
(2-1)

wherein R¹ is alkyl.

42. The liquid crystal composition according to item 41, wherein the composition further comprises at least one compound selected from a group of compounds represented by formula (3-6) as the second component:

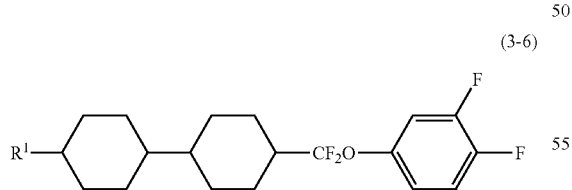
(3-6)

wherein R¹ is alkyl.

43. The liquid crystal composition according to one of items 32 to 35, wherein the composition further comprises at least one compound selected from a group of compounds represented by formulae (3-5) and (4-1) as the second component:

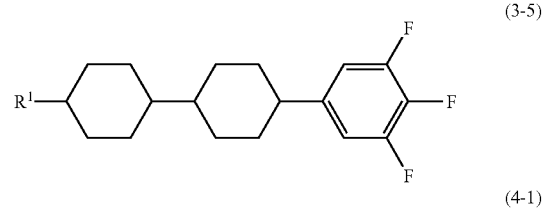
(3-5)

(4-1)

wherein R¹ is alkyl.

44. A liquid crystal composition comprising at least one compound selected from a group of compounds represented by formula (1) as a first component, at least one compound selected from a group of compounds represented by formula (2-1), at least one compound selected from a group of compounds represented by formula (3-1) and at least one compound selected from a group of compounds represented by formula (3-3) as a second component, and at least one compound selected from a group of compounds represented by formulae (5-1) and (5-2) as a third component, having a positive dielectric anisotropy, and having a nematic phase:

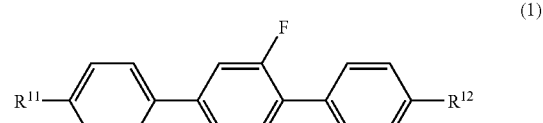
(1)

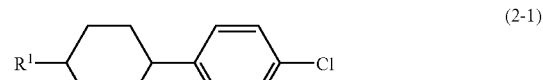
(2-1)

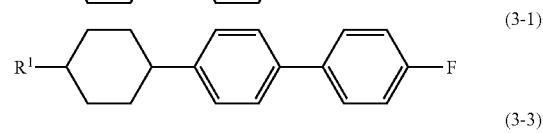
(3-1)

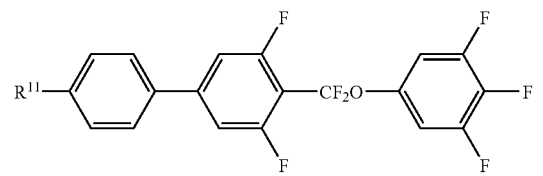
(3-3)

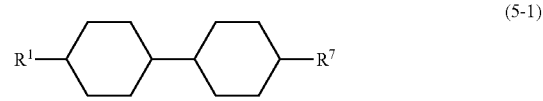
(5-1)

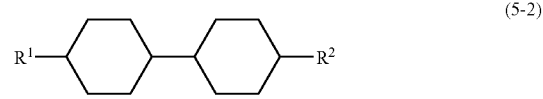
(5-2)

wherein R¹ and R² are independently alkyl; R⁷ is alkenyl; and R¹¹ and R¹² are alkyls having different carbon numbers.

45. The liquid crystal composition according to item 44, wherein a ratio of the first component is in a range of from approximately 3% to approximately 50% by weight, a ratio of the compound represented by formula (2-1) as the second component is in a range of from approximately 3% to approximately 35% by weight, a ratio of the compound represented by formula (3-1) as the second component is in a range of from approximately 5% to approximately 35% by weight, a ratio of the compound represented by formula (3-3) as the second component is in a range of from approximately 3% to approximately 40% by weight, and a ratio of the compound represented by formulae (5-1) and (5-2) as the third component is in a range of from approximately 11% to approximately 50% by weight.

46. The liquid crystal composition according to item 44, wherein a ratio of the first component is in a range of from approximately 3% by weight or more and less than approximately 10% by weight, a ratio of the compound represented by formula (2-1) as the second component is in a range of from approximately 3% to approximately 35% by weight, a ratio of the compound represented by formula (3-1) as the second component is in a range of from approximately 5% to approximately 35% by weight, a ratio of the compound represented by formula (3-3) as the second component is in a range of from approximately 3% to approximately 40% by weight, and a ratio of the compound represented by formulae (5-1) and (5-2) as the third component is in a range of from approximately 11% to approximately 50% by weight.

47. The liquid crystal composition according to item 44, wherein a ratio of the first component is in a range of from approximately 10% to approximately 50% by weight, a ratio of the compound represented by formula (2-1) as the second component is in a range of from approximately 3% to approximately 35% by weight, a ratio of the compound represented by formula (3-1) as the second component is in a range of from approximately 5% to approximately 35% by weight, a ratio of the compound represented by formula (3-3) as the second component is in a range of from approximately 3% to approximately 40% by weight, and a ratio of the compound represented by formulae (5-1) and (5-2) as the third component is in a range of from approximately 11% to approximately 50% by weight.

48. The liquid crystal composition according to one of items 44 to 47, wherein the composition further comprises at least one compound selected from a group of compounds represented by formula (3-2) as the second component:

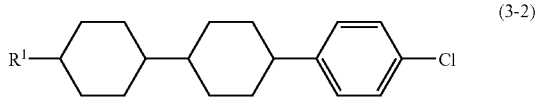

(3-2)

wherein $R^1$ is alkyl.

49. The liquid crystal composition according to one of items 44 to 47, wherein the composition further comprises at least one compound selected from a group of compounds represented by formula (3-4) as the second component, and at least one compound selected from a group of compounds represented by formula (6-2) and at least one compound selected from a group of compounds represented by formula (7-1) as the third component:

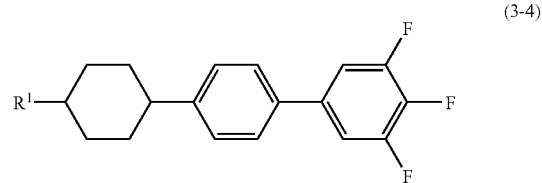

(3-4)

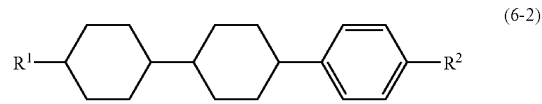

(6-2)

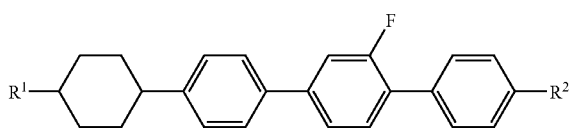

(7-1)

wherein $R^1$ and $R^2$ each independently is alkyl.

50. The liquid crystal composition according to one of items 32 to 49, wherein the composition has an optical anisotropy ranging from approximately 0.10 to approximately 0.15.

51. The liquid crystal composition according to one of items 1 to 50, wherein the composition further comprises an antioxidant.

52. The liquid crystal composition as described in one of items 32 to 35, wherein the composition further contains at least one compound selected from a group of compounds represented by formula (3-2) as the second component:

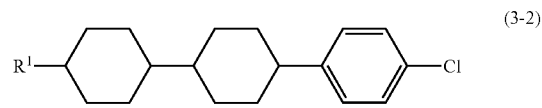

(3-2)

wherein $R^1$ is alkyl.

53. The liquid crystal composition as described in item 52, wherein the composition further contains a compound represented by formula (2-1) as the second component in a content ranging from approximately 3% to approximately 35% by weight:

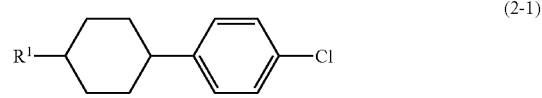

(2-1)

wherein $R^1$ is alkyl.

54. The liquid crystal composition as described in item 53, wherein the composition further contains a compound represented by formula (3-2) as the second component in a content ranging from approximately 3% to approximately 30% by weight:

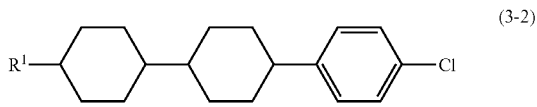 (3-2)

wherein R¹ is alkyl.

55. The liquid crystal composition as described in item 52, wherein the composition further contains a compound represented by formula (2-1) as the second component in a content ranging from approximately 3% to approximately 35% by weight, and a compound represented by formulae (3-4), (3-5) and (3-6) as the second component in a content ranging from approximately 2% to approximately 25% by weight:

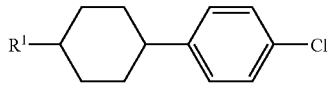 (2-1)

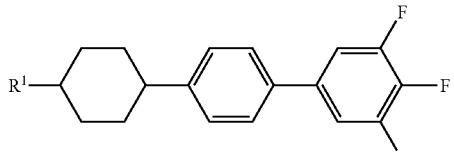 (3-4)

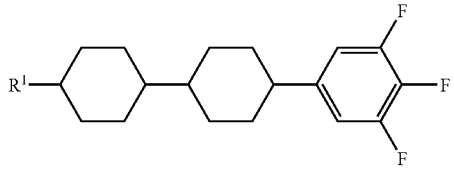 (3-5)

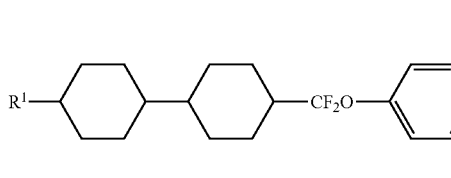 (3-6)

wherein R¹ is alkyl.

56. The liquid crystal composition as described in item 55, wherein the composition further contains a compound represented by formula (7-1) as the third component in a content ranging from approximately 2% to approximately 20% by weight:

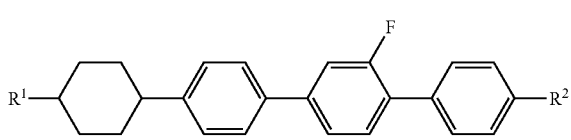 (7-1)

wherein R¹ and R² each independently is alkyl.

57. The liquid crystal composition as described in one of items 32 to 35, wherein the composition further contains a compound represented by formula (2-1) as the second component in a content ranging from approximately 3% to approximately 35% by weight:

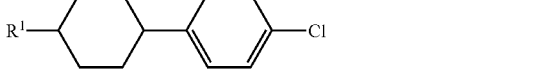 (2-1)

wherein R¹ is alkyl.

58. The liquid crystal composition as described in item 57, wherein the composition further contains a compound represented by formula (3-6) as the second component in a content ranging from approximately 3% to approximately 20% by weight:

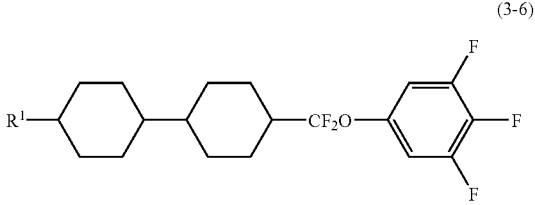 (3-6)

wherein R¹ is alkyl.

59. The liquid crystal composition as described in one of items 32 to 35, wherein the composition further contains a compound represented by formulae (3-5) and (4-1) as the second component in a content ranging from approximately 5% to approximately 30% by weight:

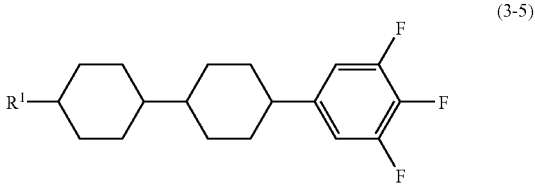 (3-5)

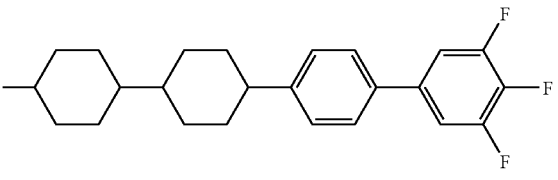 (4-1)

wherein R¹ is alkyl.

60. The liquid crystal composition as described in one of items 44 to 47, wherein the composition further contains a compound represented by formula (3-2) as the second component in a content ranging from approximately 3% to approximately 30% by weight:

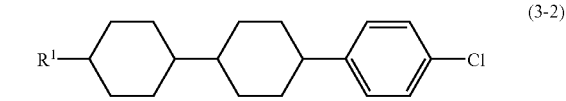 (3-2)

wherein R¹ is alkyl.

61. The liquid crystal composition as described in one of items 44 to 47, wherein the composition further contains at least one compound selected from a group of compounds represented by formula (3-4) as the second component, and at least one compound selected from a group of compounds represented by formula (6-2) and at least one compound selected from a group of compounds represented by formula (7-1) as the third component:

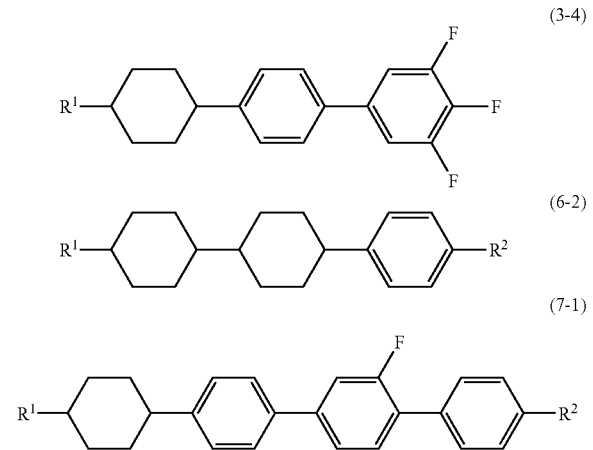

wherein $R^1$ and $R^2$ each independently is alkyl.

62. The liquid crystal composition as described in one of items 32 to 49, wherein the composition has an optical anisotropy ranging from approximately 0.10 to approximately 0.15.

63. A liquid crystal display element including the liquid composition as described in one of items 52 to 62.

64. The liquid crystal composition according to one of items 1 to 50 and 52 to 62, wherein the composition further comprises an antioxidant.

65. The liquid crystal composition according to claim 64, wherein the antioxidant is a compound represented by formula (10):

(10)

[Structure: benzene ring with C(CH₃)₃ groups at two positions, OH, and $C_nH_{2n+1}$]

wherein n is an integer of 1 to 9.

66. The liquid crystal composition according to item 64 or 65, wherein a ratio of the antioxidant is from approximately 50 ppm to approximately 600 ppm based on the total weight of the liquid crystalline compound.

67. A liquid crystal display element comprising the liquid crystal composition according to one of items 64 to 66.

The invention also includes the following: (1) the aforementioned composition having a higher limit temperature of the nematic phase of approximately 70° C. or more and a lower limit temperature of approximately −20° C. or less; (2) the aforementioned composition containing an optically active compound; (3) an AM element containing the aforementioned composition; (4) an element containing the aforementioned composition and having a TN, ECB, OCB or IPS mode; (5) a transmission element containing the aforementioned composition; (6) use of the aforementioned composition as a composition having a nematic phase; and (7) use of the aforementioned composition containing an optically active compound as an optically active composition.

The composition of the invention will be explained in the following order. First, the points of the invention will be explained. Second, the constitution of component compounds in the composition will be explained. Third, the main characteristics of the component compounds and the main effects of the compounds influencing the composition will be explained. Fourth, suitable ratios of the component compounds and their basis will be explained. Fifth, desirable embodiments of the component compounds will be explained. Sixth, concrete examples of the component compounds will be shown. Seventh, the preparation methods of the component compounds will be explained. Last, purposes of the composition will be explained.

First, the points of the invention will be explained.

The first point of the invention resides in that it has been found that the mode of exertion of the function of the compound (1) varies depending on the difference in optical anisotropy of the composition. This will be demonstrated through experimentation. The cases are compared to each other where the compound (1) is used in a composition having a relatively small optical anisotropy, and it is used in a composition having a relatively large optical anisotropy. The results are shown in Table 2. The compositions No. 1 and No. 2 in Table 2 are the case where the optical anisotropy of the composition is adjusted to approximately 0.1 or less, and the compositions No. 3 and No. 4 are the case where the optical anisotropy of the composition is adjusted to approximately 0.1 or more. The compositions No. 1 and No. 3 are examples of the case where no compound (1) is mixed, and the compositions of No. 2 and No. 4 are examples of the case where the compound (1) is mixed. The compositions No. 1 to No. 4 are prepared to have a positive dielectric anisotropy and have the same values for the higher limit temperature and the threshold voltage. It is apparent from the table that in the case where the compound (1) is used to prepare a composition having a relatively small optical anisotropy, the usefulness of the compound (1) cannot be found. In the case where the compound (1) is used to prepare a composition having a relatively large optical anisotropy, the usefulness of the compound (1) can be found. The usefulness referred herein means that the characteristics of rotation viscosity (γ1) and response time are excellent. These findings are the first point of the invention.

TABLE 2

Characteristics of Compound (1)

| | | No. 1 | No. 2 | No. 3 | No. 4 |
|---|---|---|---|---|---|
| Constitutional component and content thereof | 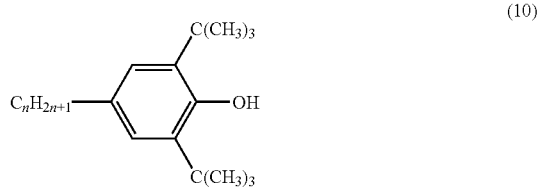 | — | 6 wt % | — | 6 wt % |

TABLE 2-continued

Characteristics of Compound (1)

| Structure | No. 1 | No. 2 | No. 3 | No. 4 |
|---|---|---|---|---|
| C$_3$H$_7$—Ph—Ph(F)—Ph—C$_5$H$_{11}$ | — | 6 wt % | — | 6 wt % |
| C$_3$H$_7$—Cy—Ph—Cl | 10 wt % | 10 wt % | 14 wt % | 2 wt % |
| C$_3$H$_7$—Ph—Ph(F,F)—CF$_2$O—Ph(F,F,F) | 17 wt % | — | 15 wt % | 18 wt % |
| C$_3$H$_7$—Cy—Cy—CF$_2$O—Ph(F,F,F) | — | 35 wt % | — | 2 wt % |
| C$_2$H$_5$—Cy—Ph—Ph—F | — | — | 7 wt % | 6 wt % |
| C$_3$H$_7$—Cy—Ph—Ph—F | — | — | 7 wt % | 6 wt % |
| C$_5$H$_{11}$—Cy—Ph—Ph—F | — | — | 7 wt % | 6 wt % |
| C$_3$H$_7$—Cy—Cy—CH=CH$_2$ | 32 wt % | 32 wt % | 32 wt % | 32 wt % |
| CH$_2$=CH—Cy—Cy—Ph—CH$_3$ | 21 wt % | 11 wt % | 4 wt % | 12 wt % |
| CH$_2$=CHC$_2$H$_4$—Cy—Cy—Ph—CH$_3$ | 20 wt % | — | — | 4 wt % |
| C$_5$H$_{11}$—Cy—Ph—Ph(F)—Ph—C$_2$H$_5$ | — | — | 7 wt % | — |
| C$_5$H$_{11}$—Cy—Ph—Ph(F)—Ph—C$_3$H$_7$ | — | — | 7 wt % | — |
| Higher limit temperature (°C.) | 77.8 | 78.0 | 78.9 | 77.7 |
| Rotation viscosity (mPa · S) | 45.4 | 50.1 | 59.2 | 54.6 |

TABLE 2-continued

Characteristics of Compound (1)

|  | No. 1 | No. 2 | No. 3 | No. 4 |
|---|---|---|---|---|
| Optical anisotropy | 0.088 | 0.088 | 0.115 | 0.114 |
| Dielectric anisotropy | 3.2 | 3.1 | 3.8 | 4.0 |
| Threshold voltage (V) | 2.03 | 2.05 | 2.05 | 2.03 |
| Response time (ms) | 11.4 | 13.3 | 10.7 | 8.9 |

The second point of the invention resides in that it has been found that the advantages derived from the characteristics of the composition varies depending on the difference in carbon number between the alkyls on the left end and the right end of the compound (1). This will be demonstrated through experimentation. The cases are compared to each other where $R^{11}$ and $R^{12}$ of the compound (1) are the same as each other in carbon number, and $R^{11}$ and $R^{12}$ of the compound (1) are different from each other in carbon number. The results are shown in Table 3. The composition No. 5 in Table 3 is the case where a compound having alkyls of $R^{11}$ and $R^{12}$ that are different from each other in carbon number is mixed, and the compositions of No. 6 and No. 7 are the case where a compound having alkyls of $R^{11}$ and $R^{12}$ that are the same as each other in carbon number is mixed. The compositions are prepared to have a positive dielectric anisotropy. It is apparent from the table that in the case where $R^{11}$ and $R^{12}$ are different from each other in carbon number, the characteristics of the composition and the element are improved. That is, the lower limit temperature of the nematic phase can be further lowered, and the rotation viscosity can be further lowered. These findings are the second point of the invention.

TABLE 3

Difference of $R^1$ and $R^2$ of Compound (1)

|  |  | No. 5 | No. 6 | No. 7 |
|---|---|---|---|---|
| Constitutional component and content thereof | 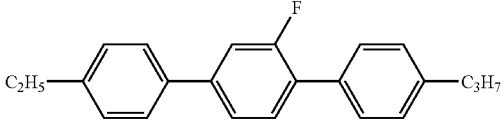 | 13 wt % | — | — |
|  | 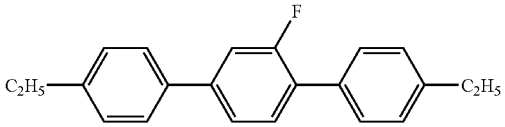 | — | 13 wt % | — |
|  | 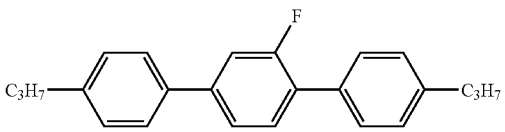 | — | — | 13 wt % |
|  | 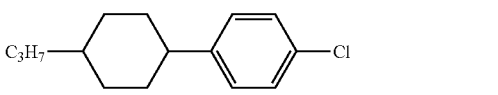 | 5 wt % | 5 wt % | 5 wt % |
|  | 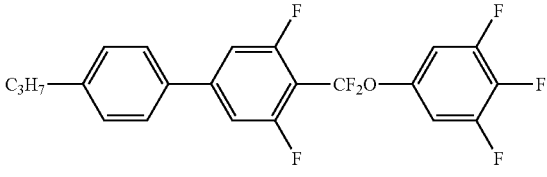 | 17 wt % | 17 wt % | 17 wt % |
|  | 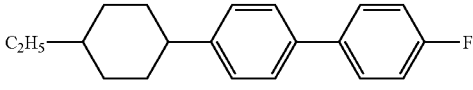 | 4 wt % | 4 wt % | 4 wt % |
|  | 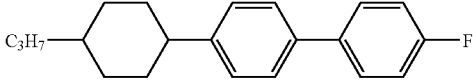 | 5 wt % | 5 wt % | 5 wt % |

TABLE 3-continued

Difference of $R^1$ and $R^2$ of Compound (1)

| | No. 5 | No. 6 | No. 7 |
|---|---|---|---|
| $C_5H_{11}$—⬡—⬡—⬡—F | 5 wt % | 5 wt % | 5 wt % |
| $C_3H_7$—⬡—⬡—CH=CH$_2$ | 37 wt % | 37 wt % | 37 wt % |
| CH$_2$=CH—⬡—⬡—⬡—CH$_3$ | 8 wt % | 8 wt % | 8 wt % |
| CH$_2$=CHC$_2$H$_4$—⬡—⬡—⬡—CH$_3$ | 6 wt % | 6 wt % | 6 wt % |
| Higher limit temperature (° C.) | 70.0 | 69.0 | 71.0 |
| Lower limit temperature (° C.) | ≦−20 | ≦0 | ≦0 |
| Rotation viscosity (mPa·S) | 44.0 | 66.9 | 44.6 |
| Optical anisotropy | 0.110 | 0.110 | 0.110 |
| Dielectric anisotropy | 3.5 | 3.5 | 3.6 |
| Threshold voltage (V) | 2.00 | 1.99 | 2.01 |

Second, the constitution of component compounds in the composition will be explained. The composition of the invention is classified into composition A and composition B. The composition A may further include other compounds. The "other compounds" include a liquid crystalline compound, an additive, an impurity and so forth. The liquid crystalline compound is different from the compounds (1) to (7). The liquid crystalline compound is mixed to the composition for the purpose of adjusting the characteristics of the composition. The additive includes an optically active compound, a coloring matter, an antioxidant and so forth. The optically active compound is mixed to the composition for the purpose of giving a twist angle by means of inducing a helical structure. The coloring matter is mixed to the composition to adjust the element of a guest host (GH) mode. The antioxidant is mixed to the composition for the purpose of preventing the specific resistance from lowering by heating in the air or of attaining a large voltage holding ratio at not only room temperature but also high temperatures even after it has been used for a long time is desirable. The antioxidant includes compounds represented by formula (10). The impurity includes compounds that are mixed during the production process of the compounds and so forth.

The composition B essentially consists of the compounds selected from the compounds (1) to (7). The term "essentially" means that the composition does not include a liquid crystalline compound which is different from these compounds. The term "essentially" also means that the composition may further include an additive, an impurity and so forth. The components of the composition B is fewer in comparison with those of the composition A. The composition B is preferable to the composition A from the viewpoint of costs. The composition A is preferable to the composition B, because the physical properties of the composition A can be further adjusted by mixing with other liquid crystalline compounds.

Examples of the liquid crystalline compound which is different from the compounds (1) to (7) include a compound having a cyano group. The compound has such a partial structure as those shown in formulae (8-1) to (8-3). The liquid crystalline compound may be contained in a composition used in an element having such a mode as the IPS mode, but the compound lowers the specific resistance of the composition, and accordingly, it is not preferred to add the compound to a composition used in such an element as an TN-TFT element. Examples of the optically active compound include those represented by formulae (9-1) to (9-4).

(8-1)

(8-2)

(8-3)

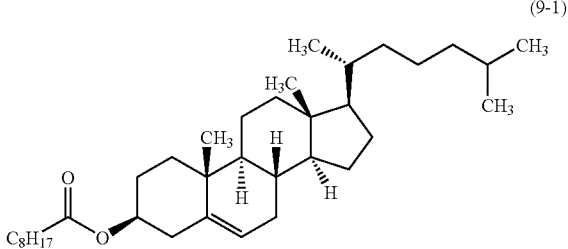
(9-1)

-continued (9-2)
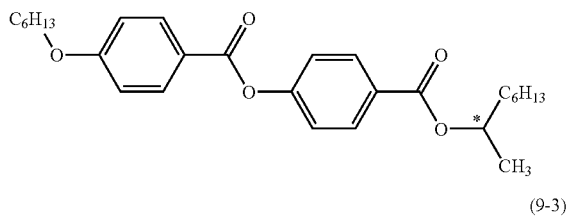

(9-3)
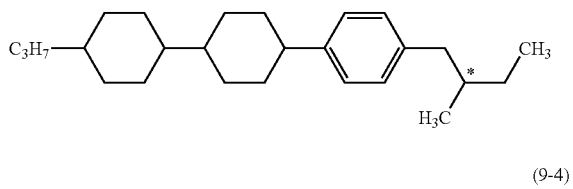

(9-4)
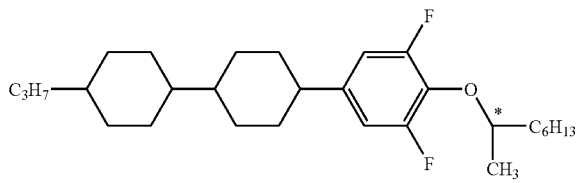

It is preferred for driving the element that a liquid crystalline compound having a dielectric anisotropy of 10 or more is mixed with the compositions of items 1 to 4. More preferably, in order to decreasing the response time of the element, a liquid crystalline compound having a dielectric anisotropy of approximately 10 or more is further mixed, and a liquid crystalline compound having a dielectric anisotropy of less than approximately 10 is further mixed.

In the case where one of the compounds (2) to (4) is selected as another essential component in the compositions of items (5) to (9), it is preferred for decreasing the response time of the element that a liquid crystalline compound having a dielectric anisotropy of less than approximately 10 is further mixed. In the case where one of the compounds (5) to (7) is selected as another essential component, it is preferred for driving the element that a liquid crystalline compound having a dielectric anisotropy of approximately 10 or more is further mixed.

Third, the main characteristics of the component compounds and the main effects of the compounds influencing the composition will be explained. The main characteristics of the compounds are summarized in Table 4. In Table 4, the letter L represents large or high, the letter M represents a middle degree and the letter S represents small or low. The number 0 indicates that the dielectric anisotropy is nearly zero (or very small).

Table 5 summarizes dielectric anisotropy of the representative component compounds. It is understood from Table 5 that the low threshold voltage for driving the element mainly depends on the second component of the invention. The expressions of the compounds in Table 5 are made according to the method of description shown in Table 6.

TABLE 5

| | Dielectric Anisotropy of Compounds | | |
|---|---|---|---|
| Component | No. of preferred compound | Compound | Dielectric anisotropy |
| First component | (1) | 2-BB(F)B-3 | 6.0 |
| Second component | (2-8) | 5-HXB(F,F)-F | 10.3 |
| | (3-3) | 3-BB(F,F)XB(F,F)-F | 27.7 |
| | (4-1) | 3-HHBB(F,F)-F | 13.0 |
| Third component | (5-1) | 5-HH-V | −1.3 |
| | (6-1) | V-HHB-1 | 3.4 |
| | (7-1) | 5-HBB(F)B-2 | 4.0 |

The main effects of the component compounds on the composition are as follows. The compound (1) increases the optical anisotropy and increases the threshold voltage in the composition. The compounds (2) to (4) decreases the threshold voltage in the composition. The compound (2) decreases the higher limit temperature in the composition. The compound (3) increases the higher limit temperature in the composition. The compound (4) further increases the higher limit temperature in the composition. The compounds (5) and (6) decrease the viscosity and increase the threshold voltage in the composition. The compound (5) decreases the higher limit temperature in the composition. The compound (6) increases the higher limit temperature in the composition. The compound (7) further increases the higher limit temperature in the composition.

The compounds will be further explained. The compound (2) includes compounds (2-1) to (2-8). Among these, the compound (2-1) decreases the lower limit temperature and decreases the viscosity in the composition.

The compound (3) includes compounds (3-1) to (3-36). Among these compounds, the compounds (3-1) to (3-6) have the following characteristics. The compound (3-1) increases the optical anisotropy, increases the upper limit temperature, and decreases the viscosity. The compound (3-2) increases the upper limit temperature, decreases the lower limit temperature, and decreases the viscosity. The compound (3-3) increases the optical anisotropy and largely decreases the threshold voltage in the composition. The compound (3-4) increases the optical anisotropy and decreases the lower limit temperature in the composition. The compound (3-5) decreases the optical anisotropy and decreases the viscosity

TABLE 4

| | Characteristics of Compound | | | | | | |
|---|---|---|---|---|---|---|---|
| | Compound (1) | Compound (2) | Compound (3) | Compound (4) | Compound (5) | Compound (6) | Compound (7) |
| Higher limit temperature | M | S | M | L | S | M | L |
| Viscosity | S | M-L | M-L | M-L | S | S-M | S-M |
| Optical anisotropy | L | M | M | M | S | M | M-L |
| Dielectric anisotropy | 0 | S-L | S-L | M-L | 0 | 0 | 0 |
| Specific resistance | L | L | L | L | L | L | L | in the composition. The compound (3-6) decreases the optical anisotropy and particularly decreases the threshold voltage in the composition.

The compound (4) includes compounds (4-1) to (4-6). Among these, the compound (4-1) decreases the viscosity in the composition. The compound (5) includes compounds (5-1) to (5-6). Among these, the compounds (5-1) and (5-2) particularly decrease the viscosity in the composition. The compound (5-1) decreases the lower limit temperature in the composition.

The compound (6) includes compounds (6-1) to (6-8). Among these, the compounds (6-1) and (6-2) particularly decrease the viscosity in the composition. The compound (6-1) decreases the lower limit temperature in the composition. The compound (7) includes compounds (7-1) to (7-5). Among these, the compound (7-1) particularly increases the optical anisotropy in the composition.

Fourth, suitable ratios of the component compounds and their basis will be explained.

A desirable ratio of the first component is approximately 3% or more for increasing the optical anisotropy in the composition and is approximately 50% or less for decreasing the lower limit temperature in the composition. A more desirable ratio thereof is approximately 3% or more and less than approximately 10% or from approximately 10% to approximately 50%. The ratio of approximately 3% or more and less than approximately 10% is preferred for decreasing the optical anisotropy and further decreasing the lower limit temperature in the composition. The ratio of from approximately 10% to approximately 50% is preferred for increasing the optical anisotropy in the composition. For increasing the optical anisotropy and further decreasing the lower limit temperature in the composition, a more desirable ratio is from approximately 11% to approximately 40% and further from approximately 11% to approximately 30%.

A desirable ratio of the second component is approximately 10% or more for decreasing the threshold voltage in the composition and is approximately 85% or less for decreasing the lower limit temperature in the composition. For further decreasing the threshold voltage and further decreasing the lower limit temperature in the composition, a more desirable ratio is from approximately 15% to approximately 80%. For particularly decreasing the threshold voltage and particularly decreasing the lower limit temperature in the composition, a particularly desirable ratio is from approximately 25% to approximately 75%.

A desirable ratio of the third component is approximately 10% or more for increasing the higher limit temperature in the composition and is approximately 80% or less for decreasing the lower limit temperature in the composition. For further increasing the higher limit temperature and decreasing the lower limit temperature in the composition, a more desirable ratio is from approximately 15% to approximately 75%. For particularly increasing the higher limit temperature and particularly decreasing the lower limit temperature in the composition, a particularly desirable ratio is from approximately 20% to approximately 65%.

For the respective compounds constituting the second component and the third component, desirable contents thereof upon mixing them will be explained. A desirable ratio of the compound (2-1) is approximately 3% or more for decreasing the lower limit temperature in the composition and is approximately 35% or less for increasing the higher limit temperature in the composition. For further increasing the higher limit temperature in the composition, a more desirable ratio is from approximately 3% to approximately 30%. For particularly increasing the higher limit temperature in the composition, a particularly desirable ratio is from approximately 3% to approximately 25%.

A desirable ratio of the compound (3-1) is approximately 5% or more for increasing the higher limit temperature in the composition and is approximately 35% or less for decreasing the lower limit temperature in the composition. For further increasing the higher limit temperature and further decreasing the lower limit temperature in the composition, a more desirable ratio is from approximately 10% to approximately 30%. For particularly decreasing the lower limit temperature in the composition, a particularly desirable ratio is from approximately 10% to approximately 25%.

A desirable ratio of the compound (3-2) is approximately 3% or more for increasing the higher limit temperature in the composition and is approximately 30% or less for decreasing the lower limit temperature in the composition. For further decreasing the lower limit temperature in the composition, a more desirable ratio is from approximately 3% to approximately 25%. For particularly increasing the higher limit temperature and particularly decreasing the lower limit temperature in the composition, a particularly desirable ratio is from approximately 5% to approximately 25%.

A desirable ratio of the compound (3-3) is approximately 3% or more for decreasing the threshold voltage in the composition and is approximately 40% or less for decreasing the lower limit temperature in the composition. For further decreasing the threshold voltage and further decreasing the lower limit temperature in the composition, a more desirable ratio is from approximately 5% to approximately 35%. For particularly decreasing the threshold voltage and particularly decreasing the lower limit temperature in the composition, a particularly desirable ratio is from approximately 10% to approximately 30%.

A desirable ratio of the compound (3-4) is approximately 3% or more for decreasing the threshold voltage in the composition and is approximately 25% or less for decreasing the lower limit temperature in the composition. For further decreasing the lower limit temperature in the composition, a more desirable ratio is from approximately 3% to approximately 20%. For particularly decreasing the threshold voltage and particularly decreasing the lower limit temperature in the composition, a particularly desirable ratio is from approximately 5% to approximately 15%.

A desirable total ratio of the compounds (3-4), (3-5) and (3-6) is approximately 2% or more for decreasing the threshold voltage in the composition and is approximately 25% or less for decreasing the lower limit temperature in the composition. For further decreasing the lower limit temperature in the composition, a more desirable ratio is from approximately 2% to approximately 20%. For particularly decreasing the lower limit temperature in the composition, a particularly desirable ratio is from approximately 2% to approximately 15%.

A desirable ratio of the compound (3-6) is approximately 3% or more for decreasing the threshold voltage in the composition and is approximately 20% or less for decreasing the lower limit temperature in the composition. For further decreasing the lower limit temperature in the composition, a more desirable ratio is from approximately 3% to approximately 15%. For particularly decreasing the threshold voltage and particularly decreasing the lower limit temperature in the composition, a particularly desirable ratio is from approximately 5% to approximately 10%.

A desirable total ratio of the compounds (3-5) and (4-1) is approximately 5% or more for decreasing the threshold voltage in the composition and is approximately 30% or less for decreasing the lower limit temperature in the composition.

For further decreasing the threshold voltage and further decreasing the lower limit temperature in the composition, a more desirable ratio is from approximately 10% to approximately 25%. For particularly decreasing the threshold voltage and particularly decreasing the lower limit temperature in the composition, a particularly desirable ratio is from approximately 15% to approximately 20%.

A desirable ratio of the compound (5-1) is approximately 11% or more for decreasing the viscosity in the composition and is approximately 50% or less for decreasing the lower limit temperature in the composition. For further decreasing the viscosity and further decreasing the lower limit temperature in the composition, a more desirable ratio is from approximately 15% to approximately 45%. For particularly decreasing the viscosity and particularly decreasing the lower limit temperature in the composition, a particularly desirable ratio is from approximately 20% to approximately 40%.

A desirable total ratio of the compounds (5-1) and (5-2) is approximately 11% or more for decreasing the viscosity in the composition and is approximately 50% or less for decreasing the lower limit temperature in the composition. For further decreasing the viscosity and further decreasing the lower limit temperature in the composition, a more desirable ratio is from approximately 15% to approximately 45%. For particularly decreasing the viscosity and particularly decreasing the lower limit temperature in the composition, a particularly desirable ratio is from approximately 20% to approximately 40%.

A desirable ratio of the compound (6-2) is approximately 3% or more for increasing the higher limit temperature in the composition and is approximately 15% or less for decreasing the lower limit temperature in the composition. For further decreasing the lower limit temperature in the composition, a more desirable ratio is from approximately 3% to approximately 10%. For particularly decreasing the lower limit temperature in the composition, a particularly desirable ratio is from approximately 3% to approximately 5%.

A desirable total ratio of the compounds (6-1) and (6-2) is approximately 3% or more for increasing the higher limit temperature in the composition and is approximately 45% or less for decreasing the lower limit temperature in the composition. For further increasing the higher limit temperature and further decreasing the lower limit temperature in the composition, a more desirable ratio is from approximately 5% to approximately 40%. For particularly increasing the higher limit temperature and particularly decreasing the lower limit temperature in the composition, a particularly desirable ratio is from approximately 10% to approximately 35%.

A desirable ratio of the compound (7-1) is approximately 2% or more for increasing the optical anisotropy in the composition and is approximately 20% or less for decreasing the lower limit temperature in the composition. For further decreasing the lower limit temperature in the composition, a more desirable ratio is from approximately 2% to approximately 15%. For particularly decreasing the lower limit temperature in the composition, a particularly desirable ratio is from approximately 2% to approximately 10%.

There is a measure of adding an antioxidant with the composition for preventing the specific resistance from decreasing upon heating in the air or for attaining a large voltage holding ratio at not only room temperature but also high temperature after it has been used for a long time. In the case where an antioxidant is added to the composition, a desirable addition amount of the antioxidant is approximately 50 ppm or more for exerting the effect thereof and is approximately 600 ppm or less for increasing the higher limit temperature of the composition and for decreasing the lower limit temperature thereof. A more desirable ratio thereof is from approximately 100 ppm to approximately 300 ppm. The addition amount herein is a ratio based on the total weight of the liquid crystalline composition.

A desirable total ratio of the first component, the second component and the third component is approximately 70% or more for obtaining favorable characteristics. A more desirable ratio is approximately 90% or more.

Fifth, desirable embodiments of the component compounds will be explained. The symbol $R^1$ is used for many compounds in the formulae for the component compounds. $R^1$ may be identical or different in these compounds. For example, there is a case that $R^1$ of the compound (2) is ethyl and $R^1$ of the compound (4) is ethyl. There is also a case that $R^1$ of the compound (2) is ethyl and $R^1$ of the compound (4) is propyl. This rule is also applicable to the symbols $R^2$, $A^1$, $Z^1$, $X^1$, $Y^1$, n and the like.

Desirable $R^1$ and $R^5$ are linear alkyl of 1 to 10 carbons. Desirable $R^3$ is linear alkyl of 1 to 10 carbons or linear alkenyl of 2 to 10 carbon. Further desirable $R^3$ is a linear alkyl of 1 to 10 carbons for decreasing the production cost. Desirable $R^4$ is a linear alkyl of 1 to 10 carbons, linear alkenyl of 2 to 10 carbons or linear alkenyl of 2 to 10 carbon having arbitrary hydrogen substituted by fluorine. Desirable $R^5$ is linear alkyl of 1 to 10 carbons or linear alkoxy of 1 to 10 carbon. Desirable $R^6$ is linear alkyl of 1 to 10 carbons or linear alkoxymethyl of 1 to 10 carbons. Desirable $R^7$ is linear alkenyl of 2 to 10 carbon. Desirable $R^{11}$ and $R^{12}$ are linear alkyl of 1 to 10 carbon. $R^{11}$ and $R^{12}$ in the same compound must have different carbon numbers.

In the other compounds than the compound (2-1), desirable alkyl is methyl, ethyl, propyl, butyl, pentyl, hexyl, heptyl or octyl. More desirable alkyl is ethyl, propyl, butyl, pentyl or heptyl for decreasing the viscosity. $R^{11}$ and $R^{12}$ in the same compound must have different carbon numbers. In these alkyls, linear alkyl is desirable as compared to branched alkyl.

In the compound (2-1), desirable alkyl is propyl, pentyl or heptyl. For decreasing the viscosity, desirable alkyl in the compound (2-1) is propyl or pentyl. For particularly decreasing the viscosity, particularly desirable alkyl in the compound (2-1) is propyl. In these alkyls, linear alkyl is desirable as compared to branched alkyl.

Desirable alkenyl vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. For decreasing the viscosity or the like purposes, more desirable alkenyl is vinyl, 1-propenyl, 3-butenyl, or 3-pentenyl. A desirable configuration of —CH═CH— in these alkenyl depends on the position of a double bond. For decreasing the viscosity or the like purposes, trans is desirable in the alkenyl such as 1-propenyl, 1-butenyl, 1-pentenyl, 1-hexenyl, 3-pentenyl and 3-hexenyl. Cis is desirable in the alkenyl such as 2-butenyl, 2-pentenyl and 2-hexenyl. In these alkenyls, linear alkenyl is desirable as compared to branched alkenyl.

Desirable alkenyl having arbitrary hydrogen substituted by fluorine is 2,2-difluorovinyl, 3,3-difluoro-2-propenyl, 4,4-difluoro-3-butenyl or 5,5-difluoro-4-pentenyl. For decreasing the viscosity or the like purposes, more desirable one is 2,2-difluorovinyl or 4,4-difluoro-3-butenyl. In these alkenyls having arbitrary hydrogen substituted by fluorine, linear alkenyl is desirable as compared to branched alkenyl.

Desirable alkoxy is methoxy, ethoxy, propoxy, butoxy, pentyloxy, hexyloxy or heptyloxy. More desirable alkoxy is methoxy or ethoxy for decreasing the viscosity or the like purposes. In these alkoxys, linear alkoxy is desirable as compared to branched alkoxy.

Desirable alkoxymethyl is methoxymethyl, ethoxymethyl, propoxymethyl, butoxymethyl or pentyloxymethyl. More desirable alkoxymethyl is methoxymethyl for decreasing the viscosity or the like purposes. In these alkoxymethyls, linear alkoxymethyl is desirable as compared to branched alkoxymethyl.

$A^1$ and $A^6$ are independently 1,4-cyclohexylene or 1,4-phenylene. $A^2$ is 1,4-cyclohexylene, 1,3-dioxane-2,5-diyl or 1,4-phenylene. For decreasing the viscosity, desirable A 2 is 1,4-cyclohexylene or 1,4-phenylene. $A^3$ is 1,4-cyclohexylene, 1,3-dioxane-2,5-diyl, 1,4-phenylene, 2-fluoro-1,4-phenylene or 2,6-difluoro-1,4-phenylene. For decreasing the viscosity, desirable $A^3$ is 1,4-cyclohexylene, 1,4-phenylene, 2-fluoro-1,4-phenylene or 2,6-difluoro-1,4-phenylene. $A^4$ is 1,4-cyclohexylene, 1,4-phenylene or 2-fluoro-1,4-phenylene. $A^5$ is 1,4-phenylene, 2-fluoro-1,4-phenylene or 2,6-difluoro-1,4-phenylene. $A^7$ is 1,4-phenylene or 2-fluoro-1,4-phenylene.

In the symbols or the structural formulae, a configuration of 1,4-cyclohexylene or 1,3-dioxane-2,5-diyl is desirably trans rather than cis for increasing the higher limit temperature. A fluoro group in 2,6-difluoro-1,4-phenylene is positioned for increasing the dielectric anisotropy of the compound. For example, see the compound (3-3) and so forth. A fluoro group in 2-fluoro-1,4-phenylene may be positioned on either the right side or the left side of the ring. A desirable position is the right side as in the compound (7-1) for decreasing the viscosity.

$Z^1$ is a single bond, $-(CH_2)_2-$, $-CF_2O-$ or $-COO-$. For decreasing the viscosity, desirable $Z^1$ is a single bond, $-(CH_2)2-$ or $-CF_2O-$. For further decreasing the viscosity, $Z^1$ is a single bond. $Z^2$ is a single bond or $-(CH_2)_2-$. For decreasing the viscosity desirable $Z^2$ is a single bond. $Z^3$ is a single bond or $-CF_2O-$. For decreasing the viscosity desirable $Z^3$ is a single bond. $Z^4$ is a single bond or $-COO-$. For decreasing the viscosity desirable $Z^4$ is a single bond.

$-COO-$ and $-CF_2O-$ are positioned for increasing the dielectric anisotropy of the compound. For example, see the compounds (2-7) and (2-8) and so forth.

$X^1$ and $X^2$ are independently hydrogen or fluorine. For decreasing the viscosity, desirable $X^1$ and $X^2$ are both hydrogen. For increasing the dielectric anisotropy, desirable $X^1$ and $X^2$ are both fluorine. For decreasing the viscosity and increasing the dielectric anisotropy, desirable $X^1$ and $X^2$ are hydrogen and fluorine, respectively.

$Y^1$ is fluorine, chlorine, $-OCF_3$ or $-OCF_2H$. For decreasing the viscosity, desirable $Y^1$ is fluorine, chlorine or $-OCF_3$, and more desirable $Y^1$ is fluorine or chlorine. $Y^2$ is fluorine or chlorine. For decreasing the viscosity, desirable $Y^2$ is chlorine.

Sixth, concrete examples of the component compounds will be shown. In the following desirable compounds, $R^1$ and $R^2$ are independently alkyl, and desirably linear alkyl of 1 to 10 carbon. $R^2$ is alkenyl, and desirably linear alkenyl of 2 to 10 carbon. More desirable alkyl and alkenyl have been described hereinabove. In the desirable compounds, the configuration of 1,4-cyclohexylene and 1,3-dioxane-2,5-diyl is desirably trans rather than cis for increasing the higher limit temperature.

A desirable combination of $R^{11}$ and $R^{12}$ in the compound (1) is ethyl and propyl, ethyl and pentyl, propyl and pentyl, and propyl and butyl, for decreasing the lower limit temperature and decreasing the viscosity. In these alkyls, linear alkyl is desirable as compared to branched alkyl.

The desirable compound (2) is the compounds (2-1) to (2-8). For decreasing the viscosity and decreasing the lower limit temperature, the more desirable compound (2) is the compounds (2-1) and (2-2). For decreasing the lower limit temperature, the particularly desirable compound (2) is the compound (2-1).

The desirable compound (3) is the compounds (3-1) to (3-36). For decreasing the viscosity, the more desirable compound (3) is the compounds (3-1) to (3-12), and the particularly desirable compound (3) is the compounds (3-1) to (3-6).

Among the compounds (3-1) to (3-6), the compounds (3-1) and (3-2) are desirable for increasing the higher limit temperature. The compound (3-1) is desirable for increasing the higher limit temperature and increasing the optical anisotropy. The compound (3-2) is desirable for increasing the higher limit temperature and decreasing the lower limit temperature.

Among the compounds (3-1) to (3-6), the compounds (3-3) to (3-6) are desirable for increasing the dielectric anisotropy. The compounds (3-3) and (3-4) are desirable for increasing the dielectric anisotropy and increasing the optical anisotropy. The compounds (3-5) and (3-6) are desirable for increasing the dielectric anisotropy and decreasing the optical anisotropy.

Among the compounds (3-3) and (3-4), the compound (3-3) is desirable for further increasing the dielectric anisotropy. For further decreasing the viscosity, the compound (3-4) is desirable. Among the compounds (3-5) and (3-6), the compound (3-6) is desirable for further decreasing the dielectric anisotropy. For further decreasing the viscosity, the compound (3-5) is desirable.

The desirable compound (4) is the compounds (4-1) to (4-6). For decreasing the viscosity, the more desirable compound (4) is the compounds (4-1) and (4-2), and the particularly desirable compound (4) is the compound (4-1).

The desirable compound (5) is the compounds (5-1) to (5-6). For decreasing the viscosity, the more desirable compound (5) is the compounds (5-1) to (5-3), and the particularly desirable compound (5) is the compounds (5-1) and (5-2). Among the compounds (5-1) and (5-2), the compound (5-1) is desirable for further decreasing the lower limit temperature, and the compound (5-2) is desirable for decreasing the production cost.

The desirable compound (6) is the compounds (6-1) to (6-8). For decreasing the viscosity, the more desirable compound (6) is the compounds (6-1) to (6-3), and the particularly desirable compound (6) is the compounds (6-1) and (6-2). Among the compounds (6-1) and (6-2), the compound (6-1) is desirable for further decreasing the lower limit temperature, and the compound (6-2) is desirable for decreasing the production cost.

The desirable compound (7) is the compounds (7-1) to (7-5). For decreasing the viscosity, the more desirable compound (7) is the compounds (7-1) to (7-3), and the particularly desirable compound (7) is the compound (7-1).

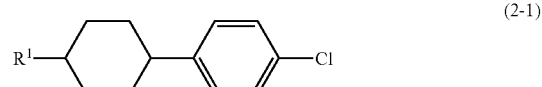

(2-1)

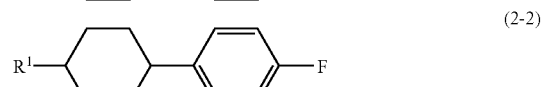

(2-2)

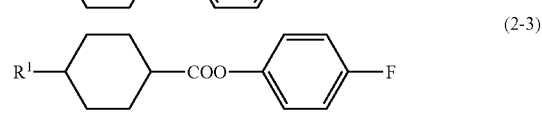

(2-3)

-continued
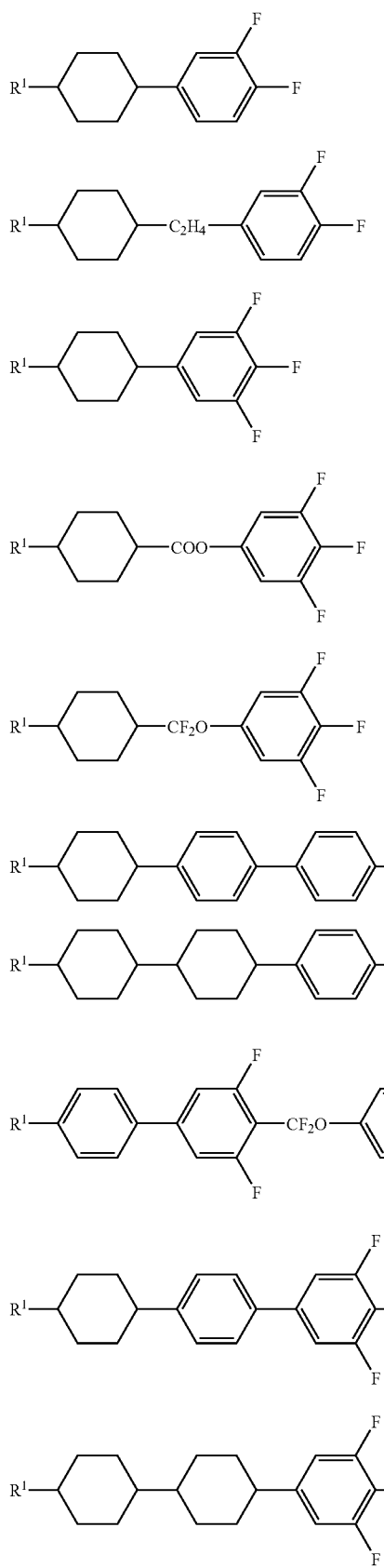
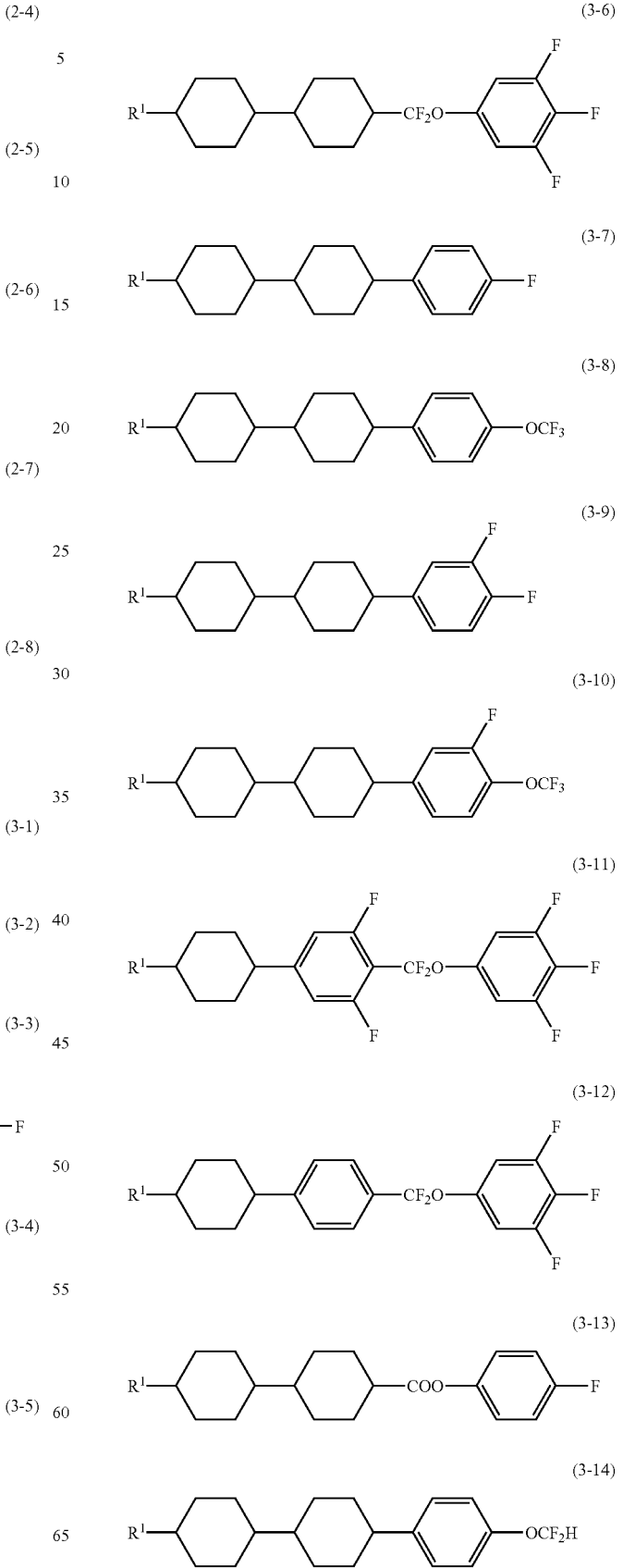

-continued (3-15)

(3-16)

(3-17)

(3-18)

(3-19)

(3-20)

(3-21)

(3-22)

(3-23)

(3-24)

-continued (3-25)

(3-26)

(3-27)

(3-28)

(3-29)

(3-30)

(3-31)

(3-32)

-continued
(3-33)
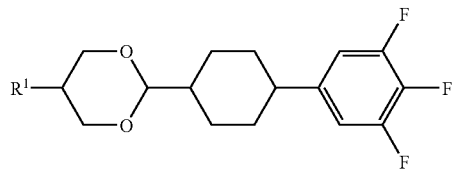
(3-34)
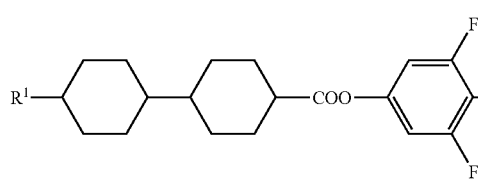
(3-35)
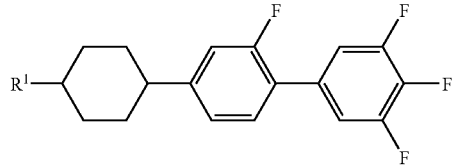
(3-36)
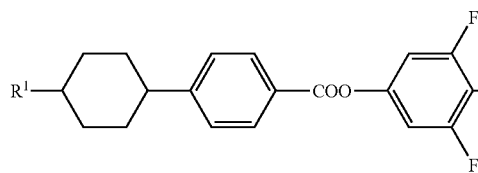
(4-1)
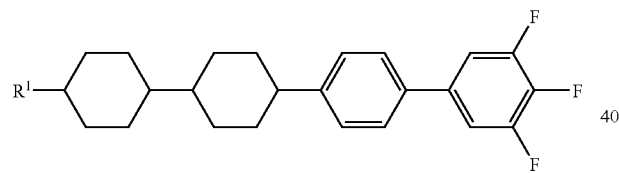
(4-2)
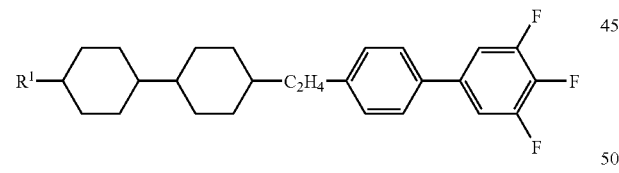
(4-3)
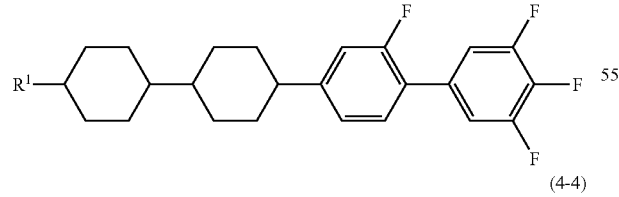
(4-4)
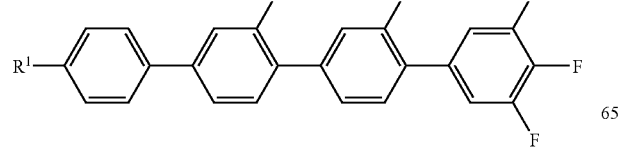
-continued
(4-5)
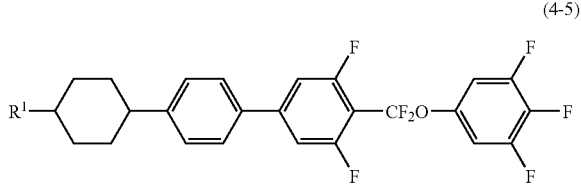
(4-6)
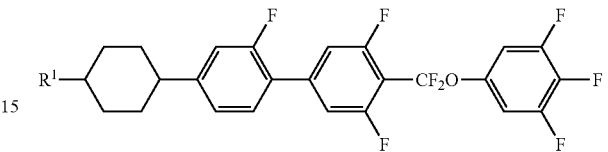
(5-1)
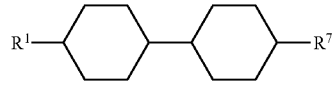
(5-2)
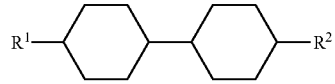
(5-3)
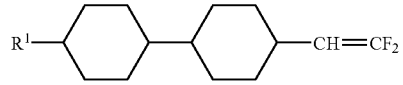
(5-4)
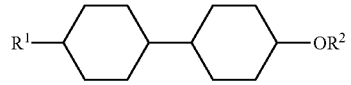
(5-5)
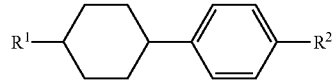
(5-6)
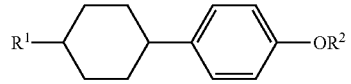
(6-1)
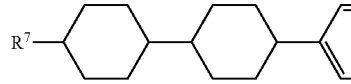
(6-2)
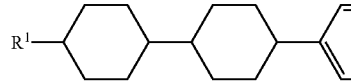
(6-3)
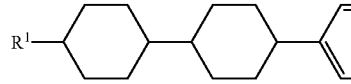
(6-4)
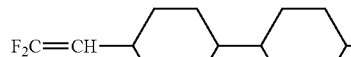
(6-5)
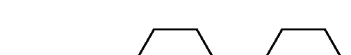
(6-6)

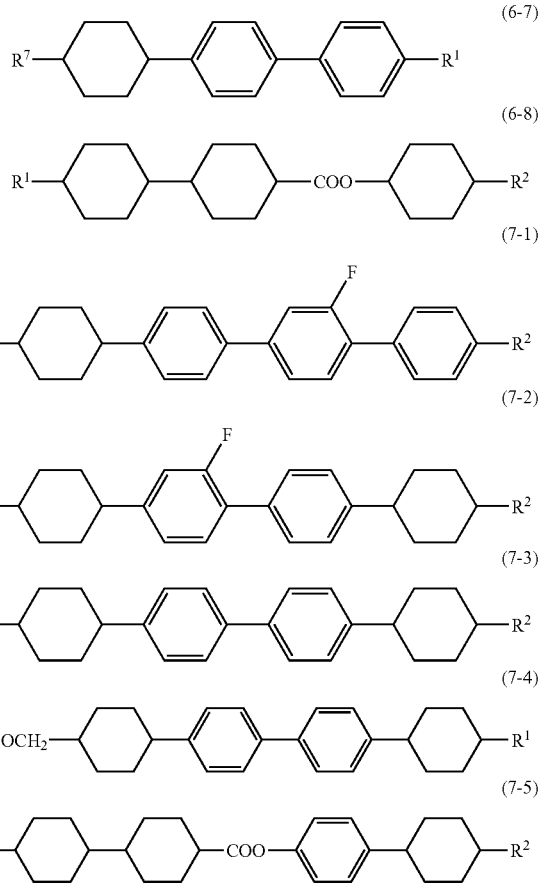

In the case where an antioxidant is added to the composition, the desirable antioxidant is the compound (10).

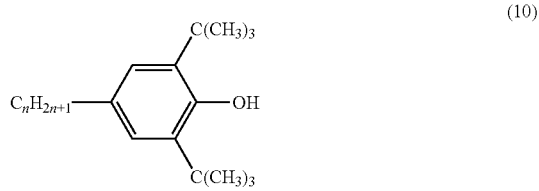

The desirable n is an integer of 1 to 9. The more desirable n is 1, 3, 5, 7 or 9. The particularly desirable n is 1 or 7. The compound where n is 1 is effective for preventing the specific resistance from decreasing upon heating in the air owing to the large volatility. The compound where n is 7 is effective for increasing the voltage holding ratio at not only room temperature but also high temperature after it has been used for a long time owing to the small volatility.

Seventh, the preparation methods of the component compounds will be explained. These compounds are prepared by known methods. The preparation method will be exemplified. The compound (1) is prepared according to the method described in JP S60-51135 A/1985. The compound (2-1) is prepared according to the method described in JP S58-126823 A/1983. The compound (3-3) is prepared according to the method described in JP 2000-95715 A/2000. The compound (4-1) is prepared according to the method described in JP H2-233626 A/1990. The compound (5-1) is prepared according to the method described in JP S61-27928 A/1986. The compound (6-2) is prepared according to the method described in JP S57-165328 A/1982. The compound (7-1) is prepared according to the method described in JP H2-237949 A/1990.

The compounds where their preparation methods were not described above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.) and so forth. The compound of formula (10) where n is 1 is commercially available, for example, from Sigma-Aldrich Co. (US). The compound of formula (10) where n is 7 is prepared according to the method described in U.S. Pat. No. 3,660,505. The composition is prepared according to known methods of mixing the compounds thus obtained. For example, the component compounds are mixed and dissolved in each other by heating.

Last, purposes of the composition will be explained. The most of the compositions of the invention have a lower limit temperature of mainly −20° C. or less, a higher limit temperature of mainly 70° C. or more, and an optical anisotropy ranging from approximately 0.10 to approximately 0.15. An element containing the composition has a large voltage holding ratio. The compositions are suitable for an AM element. The compositions are especially suitable for an AM element of a transmission type. By controlling the ratios of the component compounds or by further mixing with other liquid crystalline compounds, the composition having an optical anisotropy ranging from approximately 0.07 to approximately 0.18 may be prepared or the composition having an optical anisotropy ranging from approximately 0.06 to approximately 0.20 may be further prepared. The compositions can be used as a composition having a nematic phase, or used as an optically active composition by adding an optically active compound thereto.

The composition can be used for an AM element and also for a PM element. The composition can be used for the elements having the modes such as PC, TN, STN, ECB, OCB, IFS, VA, and so forth. The composition is desirably used for the elements having the modes of TN, ECB, OCB or IPS. These elements may be a reflection type, a transmission type or a semi-transmission type. These elements are desirably applied to an element of a transmission type. The composition is also usable for an amorphous silicon TFT element or a polycrystalline silicon TFT element. The composition is also usable for a nematic curvilinear aligned phase (NCAP) element prepared by microcapsulating the composition, and for a polymer dispersed (PD) element in which a three dimensional net-work polymer is formed in the composition, for example, a polymer network (PN) element.

EXAMPLES

The invention will be explained in detail by way of examples. The invention is not limited by the Examples below. The compounds described in the Comparative Examples and Examples are expressed by the symbols based on the definition described in Table 6. In Table 6, the configuration of 1,4-cyclohexylene and 1,3-dioxane-2,5-diyl is trans. The configuration regarding a bonding group of —CH═CH— is trans. The parenthesized number next to the symbolized compounds in the Examples corresponds to the number of the desirable compound. The symbol (-) means other liquid crystalline compounds. The ratio of the liquid crystalline compounds (percentage) is percentage by weight (% by weight) based on the total weight of the liquid crystalline compounds. Finally, the characteristics of the composition are summarized.

TABLE 6

Method for Description of Compounds Using Symbols
R—(A$_1$)—Z$_1$—...—Z$_n$—(A$_n$)—X

| 1) Left terminal R— | Symbol |
|---|---|
| C$_n$H$_{2n+1}$— | n- |
| C$_m$H$_{2m+1}$OC$_n$H$_{2n}$— | mOn- |
| CH$_2$=CH— | V— |
| C$_n$H$_{2n+1}$CH=CH— | nV— |
| CH$_2$=CHC$_n$H$_{2n}$— | Vn- |
| CF$_2$=CH— | VFF— |

| 2) Ring Structure —A$_n$— | Symbol |
|---|---|
| 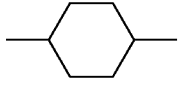 | H |
| 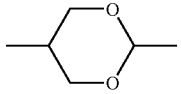 | G |
| 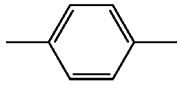 | B |
| 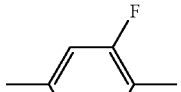 | B (F) |
| 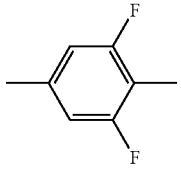 | B (F, F) |

| 3) Bonding group —Z$_n$— | Symbol |
|---|---|
| —C$_2$H$_4$— | 2 |
| —COO— | E |
| —CF$_2$O— | X |

| 4) Right terminal —X | Symbol |
|---|---|
| —C$_n$H$_{2n+1}$ | -n |
| —OC$_n$H$_{2n+1}$ | —On |
| —CH=CH$_2$ | —V |
| —F | —F |
| —Cl | —CL |
| —OCF$_3$ | —OCF3 |
| —OCF$_2$H | —OCF2H |
| —CN | —C |

5) Examples of Description

Example 1 3-HB-CL

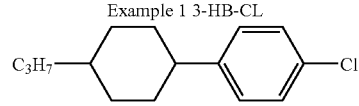

TABLE 6-continued

Method for Description of Compounds Using Symbols
R—(A$_1$)—Z$_1$—...—Z$_n$—(A$_n$)—X Example 2 3-HH-4

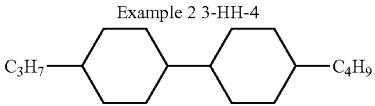

Example 3 3-BB(F,F)XB(F,F)—F

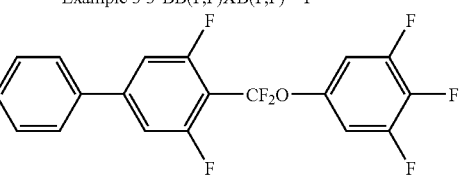

Example 4 2-BB(F)-B-3

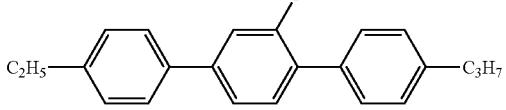

The composition is prepared by measuring the weight of the components, such as the liquid crystalline compounds, and mixing them. Therefore, the weight percentages of the components can be easily calculated. However, it is not easy to calculate the ratios of the components easily by gas chromatography analysis. This is because the compensation coefficient depends on the kind of the liquid crystalline compound. The compensation coefficient is approximately 1. Furthermore, influence of a fluctuation by approximately 1% by weight in the component compounds on the characteristics of the composition is small. Accordingly, in the invention, the area ratios of the component peaks in gas chromatograph can be regarded as the weight percentages of the component compounds. In other words, the results of gas chromatography analysis (area ratios of peaks) can be understood as the weight percentages of the liquid crystalline compounds without any compensation.

In the case where a sample to be measured was a composition, it was measured as it is, and resulting values were shown. In the case where a sample was a compound, the following manner was employed. 15% by weight of the sample and 85% by weight of the mother liquid crystals were mixed to prepare a sample. The characteristic value is calculated by the extrapolation method from the value obtained by the measurement.

Extrapolated value=((Measurement value of sample)−0.85×(Measurement value of mother liquid crystals))/0.15

In cases where crystals (or a smectic phase) was deposited at the ratio of the compound and the mother liquid crystals at 25° C., the ratio was changed to 10% by weight/90% by weight, 5% by weight/95% by weight, and 1% by weight/99% by weight, in this order. The higher limit temperature, the optical anisotropy, the viscosity and the dielectric anisotropy of the compounds were obtained by the aforementioned extrapolation method.

The mother liquid crystals had the following composition.

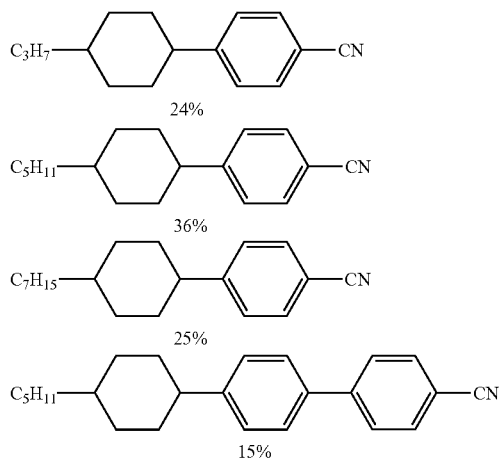

The measurement of the characteristics was carried out according to the following methods. Most of them are methods described in EIAJ ED-2521A of the Standard of Electric Industrial Association of Japan or methods obtained by modifying them. The TN element used for the measurement had no TFT attached.

A higher limit temperature of a nematic phase (NI; ° C.) A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit temperature of a nematic phase may be abbreviated to "a higher limit temperature".

A lower limit temperature of a nematic phase (Tc; ° C.): A sample having a nematic phase was put in a glass bottle and kept in a freezer at temperatures of 0° C., −10° C., −20° C., −30° C., and −40° C. for ten days, respectively, and a liquid crystal phase was observed. For example, when the sample remained in a nematic phase at −20° C. and the sample changed to crystals or a smectic phase at −30° C., Tc was expressed as ≦−20° C. A lower limit temperature of a nematic phase may be abbreviated to "a lower limit temperature".

Viscosity (η; mPa·s, measured at 20° C.): A viscosity was measured by means of an E-type viscometer.

Rotation viscosity (γ1; mPa·s, measured at 25° C.): A rotation viscosity was measured according to the method disclosed in M. Imai, et al., Molecular Crystals and Liquid Crystals, vol. 259, p. 37 (1995). The sample was placed in a TN element having a twist angle of 0° and a distance between two glass plates (cell gap) of 5 μm. The TN element was applied with a voltage in a range of from 16 V to 19.5 V stepwise by 0.5 V. After a period of 0.2 second with no application of voltage, voltage application was repeated with only one rectangular wave (rectangular pulse of 0.2 second) and application of no voltage (2 seconds). A peak current and a peak time of a transient current that was generated by the application of voltage were measured. A value of rotation viscosity was obtained from the measured values and the calculating formula (8) in the literature by M. Imai, et al on page 40. The value of dielectric anisotropy, which was necessary for the calculation, was obtained according to the following measuring method of dielectric anisotropy with the element used for measuring the rotation viscosity.

Optical anisotropy (refractive index anisotropy; Δn; measured at 25° C.): An optical anisotropy was measured by means of an Abbe refractometer having a polarizing plate attached to the eyescope with a light having a wavelength of 589 nanometers. After rubbing the surface of the main prism in one direction, the sample was dropped on the main prism. The refractive index n∥ was measured when the polarizing direction was in parallel to the rubbing direction. The refractive index n⊥ was measured when the polarizing direction was perpendicular to the rubbing direction. A value of optical anisotropy was calculated from an equation:

$$\Delta n = n\| - n\perp$$

Dielectric anisotropy (Δ∈; measured at 25° C.): A sample was poured into a TN element in which the cell gap between two glass plates was 9 micrometers and a twist angle was 80 degrees. A sine wave (10V, 1 kHz) was applied to the element, and after two seconds, a dielectric constant (∈∥) that is parallel to a liquid crystal molecule was measured. A sine wave (0.5 V, 1 kHz) was applied to the element, and after two seconds, a dielectric constant (∈⊥) that is perpendicular to a liquid crystal molecule was measured. A value of dielectric anisotropy was calculated from an equation:

$$\Delta\in = \in\| - \in\perp$$

Threshold voltage (Vth; measured at 25° C.; V): Measurement was carried out by using a brightness meter, Model LCD5100, produced by Otsuka Electronics Co., Ltd. A halogen lamp was used as a light source. A sample was poured into a TN element of a normally white mode, in which a cell gap between two glass plates was 5.0 micrometers and a twist angle was 80 degrees. A voltage (32 Hz, rectangular wave) applied to the element was increased from 0 V to 10 V stepwise by 0.02 V. At this time, the element was irradiated with light in the perpendicular direction to measure the light amount transmitted through the element. A voltage-transmittance curve was prepared with the maximum light amount being 100% and the minimum light amount being 0%. The threshold voltage was designated as a voltage at which the transmittance was 90%.

Voltage holding ratio (VHR; measured at 25° C. and 100° C.; %): A TN element used for the measurement had a polyimide alignment film and the TN element's cell gap was 6 micrometers. A sample was poured into the element, which was then sealed with an adhesive that is polymerized with an ultraviolet ray. The TN element was charged by applying a pulse voltage (5V for 60 microseconds). The voltage thus attenuated was measured with a high-speed voltmeter for 16.7 milliseconds, and an area A between the voltage curve and the abscissa per unit cycle was obtained. An area where the voltage was not attenuated was designated as an area B. The voltage holding ratio was a percentage of the area A with respect to the area B. A voltage holding ratio obtained by measuring at 25° C. was expressed as VHR-1. A voltage holding ratio obtained by measuring at 100° C. was expressed as VHR-2. The TN element was then heated to 100° C. for 250 hours. A voltage holding ratio obtained by measuring at 25° C. the element after heating was expressed as VHR-3. A voltage holding ratio obtained by measuring at 100° C. the element after heating was expressed as VHR-4. VHR-1 and VHR-2 corresponded to evaluation in the initial stage. VHR-3 and VHR-4 corresponded to evaluation after using the element for a long period of time.

Response time (τ; measured at 25° C.; millisecond): Measurement was carried out by using a brightness meter, Model LCD5100, produced by Otsuka Electronics Co., Ltd. A halogen lamp was used as a light source. A low-pass filter was set at 5 kHz. A sample was poured into a TN element of a normally white mode, in which a cell gap between two glass plates was 5.0 micrometers and a twist angle was 80 degrees. A rectangular wave (60 Hz, 5 V, 0.5 second) was applied to the element. The element was irradiated with light in the perpendicular direction to measure the light amount transmitted through the element. The transmittance was 100% when the light amount was maximum, and the transmittance was 0% when the light amount was minimum. The rise time (τr) was a period of time required for changing the transmittance from 90% to 10%. The fall time (τf) was a period of time required for changing the transmittance from 10% to 90%. The response time was a sum of the rise time and the fall time thus obtained.

Gas chromatography analysis: Measurement was carried out by using a gas chromatography apparatus Model GC-14B, produced by Shimadzu Corporation. A carrier gas was helium (2 mL/min). The sample vaporizing chamber was set at 280° C., and the detector (FID) was set at 300° C. The component compounds were separated by using a capillary column DB-1 (length: 30 m; inner diameter: 0.32 mm; membrane thickness: 0.25 μm; stationary phase: dimethylpolysiloxane; no polarity), produced by Aligent Technologies, Inc. The column was maintained at 200° C. for 2 minutes and then increased in temperature to 280° C. at a rate of 5° C. per minute. A sample was formed into an acetone solution (0.1 wt. %), and 1 μL thereof was injected into the sample vaporizing chamber. Chromatopac Model C-R5A, produced by Shimadzu Corporation, or an equivalent product thereof was used as a recorder. The resulting gas chromatogram exhibited peak retention times and peak areas corresponding to the component compounds.

The solvent for diluting the sample may be chloroform, hexane and so forth. The following capillary columns may be used for separating the component compounds: HP-1 (length: 30 m; inner diameter: 0.32 mm; membrane thickness: 0.25 μm), produced by Aligent Technologies, Inc.; Rtx-1 (length: 30 m; inner diameter: 0.32 mm; membrane thickness: 0.25 μm), produced by Restek Corporation; and BP-1 (length: 30 m; inner diameter: 0.32 mm; membrane thickness: 0.25 μm), produced by SGE International Pty. Ltd. In order to prevent compound peaks from overlapping, a capillary column CBP1-M50-025 (length: 50 m; inner diameter: 0.25 mm; membrane thickness: 0.25 μm), produced by Shimadzu Corporation may be used. The area ratios of the peaks in the gas chromatogram correspond to the ratios of the component compounds. The weight percentages of the component compounds do not completely agree with the area ratios of the peaks. In the invention, however, the weight percentages of the component compounds can be regarded as being the same as the area ratios of the peaks upon using the aforementioned columns. This is because there is no large difference in compensation coefficients among the component compounds.

Comparative Example 1

Mixture 1 was chosen from the compositions disclosed in JP S60-51135 A/1985 (U.S. Pat. No. 4,594,465, EP 0 132 377 A2). The basis is that the composition does not contain an optically active compound and a compound having a negative dielectric anisotropy. The components and characteristics of the composition are as follows. In the composition, the lower limit temperature is high, the optical anisotropy is large, $\gamma 1$ is large, VHR-2 is small, and the response time is long.

| 5-BB(F)B-5 | 20% |
| 3-BB(F)B-5 | 20% |
| 2-BB-C | 10% |
| 4-BB-C | 10% |

-continued

| 2-HB-C | 10% |
| 4-HB-C | 10% |
| 3-B(F)B2H-3 | 20% |

NI=82.6° C.; Tc≦0° C.; Δn=0.188; Δ∈=6.7; γ1=144.2 mPa·s; Vth=1.98 V; VHR-1=99.0%; VHR-2=53.6%; τ=16.4 ms

Comparative Example 2

Example (4-a) was chosen from the compositions disclosed in WO2004/035710A1/1985. The basis is that the γ1 values are disclosed, and the composition has the smallest γ1. The components and characteristics of the composition are as follows. In the composition, the optical anisotropy is small, γ1 is large, and the response time is long.

| 3-HH-5 | 3% |
| 1V-HH-3 | 4% |
| 1-HHB(F,F)-F | 10% |
| 2-HHB(F,F)-F | 8% |
| 3-HHB(F,F)-F | 9% |
| 2-HHB(F)-OCF3 | 12% |
| 2-HHB-OCF3 | 8% |
| 3-HHB-OCF3 | 8% |
| 4-HHB-OCF3 | 5% |
| 5-HHB-OCF3 | 7% |
| 2-BB(F,F)XB(F,F)-F | 6% |
| 3-BB(F,F)XB(F,F)-F | 9.5% |
| 2-HB(F)B(F,F)-F | 3.5% |
| 3-HHB(F)B(F,F)-F | 5% |
| 3-HBBH-3 | 2% |

NI=89.6° C.; Tc≦-30° C.; Δn=0.094; Δ∈=8.8; γ1=122.1 mPa·s; Vth=1.25 V; VHR-1=99.7%; VHR-2=92.1%; τ=21.3 ms

Comparative Example 3

Example (3-b)

M3A+1.0 wt % PGP-2-2 was chosen from the compositions disclosed in WO2004/035710A1/1985. The basis is that the composition contains the compound (1) of the invention. The components and characteristics of the composition are as follows. In the composition, the higher limit temperature is low, the lower limit temperature is high, the optical anisotropy is small, and the response time is long.

| V-HH-5 | 7.9% |
| 5-HB-3 | 23.8% |
| 2-HHB(F,F)-F | 11.9% |
| 3-HHB(F,F)-F | 11.9% |
| 5-HHB(F,F)-F | 7.9% |
| 3-HHB-1 | 7.9% |
| V-HHB(F)-F | 7.9% |
| 3-BB(F,F)XB(F,F)-F | 19.8% |
| 2-BB(F)B-2 | 1.0% |

NI=39.6° C.; Tc≦−10° C.; Δn=0.072; Δε=5.3; γ1=56.0 mPa·s; Vth=1.09 V; VHR-1=99.6%; VHR-2=92.2%; τ=24.6 ms

Example 1

| 2-BB(F)B-3 | (1) | 12% |
| 2-HBB-F | (3-1) | 4% |
| 3-HBB-F | (3-1) | 5% |
| 5-HBB-F | (3-1) | 5% |
| 3-BB(F,F)XB(F,F)-F | (3-3) | 20% |
| V-HH-3 | (5-1) | 40% |
| V-HHB-1 | (6-1) | 14% |

NI=70.0° C.; Tc≦−20° C.; Δn=0.109; Δε=3.9; γ1=43.2 mPa·s; Vth=1.91 V; VHR-1=99.5%; VHR-2=92.0%; τ=7.1 ms

Example 2

| 2-BB(F)B-3 | (1) | 13% |
| 3-HB-CL | (2-1) | 5% |
| 2-HBB-F | (3-1) | 4% |
| 3-HBB-F | (3-1) | 5% |
| 5-HBB-F | (3-1) | 5% |
| 3-BB(F,F)XB(F,F)-F | (3-3) | 17% |
| V-HH-3 | (5-1) | 37% |
| V-HHB-1 | (6-1) | 8% |
| V2-HHB-1 | (6-1) | 6% |

NI=70.0° C.; Tc≦−20° C.; Δn=0.110; Δε=3.5; γ1=44.0 mPa·s; Vth=2.00 V; VHR-1=99.7%; VHR-2=92.5%; τ=8.6 ms

Example 3

| 2-BB(F)B-3 | (1) | 4% |
| 3-HB-CL | (2-1) | 5% |
| 2-HBB-F | (3-1) | 5% |
| 3-HBB-F | (3-1) | 5% |
| 5-HBB-F | (3-1) | 5% |
| 3-HHB-CL | (3-2) | 6% |
| 3-BB(F,F)XB(F,F)-F | (3-3) | 24% |
| V-HH-3 | (5-1) | 16% |
| 1V-HH-3 | (5-1) | 10% |
| V-HHB-1 | (6-1) | 10% |
| V2-HHB-1 | (6-1) | 10% |

NI=79.8° C.; Tc≦−30° C.; Δn=0.111; Δε=5.4; γ1=61.7 mPa·s; Vth=1.88 V; VHR-1=99.5%; VHR-2=92.3%; τ=9.5 ms

Example 4

| 2-BB(F)B-5 | (1) | 4% |
| 2-BB(F)B-3 | (1) | 7% |
| 3-BB(F)B-5 | (1) | 3% |
| 3-HB-CL | (2-1) | 7% |

-continued

| 2-HBB-F | (3-1) | 2% |
| 3-HBB-F | (3-1) | 6% |
| 5-HBB-F | (3-1) | 5% |
| 3-HHB-CL | (3-2) | 6% |
| 3-BB(F,F)XB(F,F)-F | (3-3) | 17% |
| V-HH-3 | (5-1) | 19% |
| 1V-HH-3 | (5-1) | 12% |
| V-HHB-1 | (6-1) | 7% |
| 3-HHB-1 | (6-2) | 5% |

NI=80.6° C.; Tc≦−20° C.; Δn=0.119; Δε=3.9; γ1=56.9 mPa·s; Vth=2.17 V; VHR-1=99.6%; VHR-2=92.7%; τ=8.3 ms

Example 5

| 2-BB(F)B-5 | (1) | 6% |
| 3-BB(F)B-5 | (1) | 6% |
| 3-HB-CL | (2-1) | 2% |
| 2-HBB-F | (3-1) | 6% |
| 3-HBB-F | (3-1) | 6% |
| 5-HBB-F | (3-1) | 6% |
| 3-BB(F,F)XB(F,F)-F | (3-3) | 18% |
| 3-HHXB(F,F)-F | (3-6) | 2% |
| V-HH-3 | (5-1) | 32% |
| V-HHB-1 | (6-1) | 12% |
| V2-HHB-1 | (6-1) | 4% |

NI=77.7° C.; Tc≦−20° C.; Δn=0.114; Δε=4.0; γ1=54.6 mPa·s; Vth=2.02 V; VHR-1=99.8%; VHR-2=92.6%; τ=8.9 ms

Example 6

| 2-BB(F)B-5 | (1) | 6% |
| 2-BB(F)B-3 | (1) | 4% |
| 3-HB-CL | (2-1) | 11% |
| 2-HBB-F | (3-1) | 6% |
| 3-HBB-F | (3-1) | 6% |
| 5-HBB-F | (3-1) | 6% |
| 3-BB(F,F)XB(F,F)-F | (3-3) | 10% |
| 3-HBB(F,F)-F | (3-4) | 10% |
| 2-HHB(F,F)-F | (3-5) | 2% |
| V-HH-3 | (5-1) | 21% |
| V-HHB-1 | (6-1) | 10% |
| 3-HHB-1 | (6-2) | 6% |
| 5-HBB(F)B-2 | (7-1) | 2% |

NI=80.7° C.; Tc≦−30° C.; Δn=0.120; Δε=4.0; γ1=62.8 mPa·s; Vth=2.06 V; VHR-1=99.7%; VHR-2=92.3%; τ=9.4 ms

Example 7

| 2-BB(F)B-5 | (1) | 6% |
| 2-BB(F)B-3 | (1) | 4% |
| 3-HB-CL | (2-1) | 14% |
| 2-HBB-F | (3-1) | 6% |
| 3-HBB-F | (3-1) | 6% |
| 5-HBB-F | (3-1) | 6% |

-continued

| | | |
|---|---|---|
| 3-BB(F,F)XB(F,F)-F | (3-3) | 10% |
| 3-HBB(F,F)-F | (3-4) | 10% |
| V-HH-3 | (5-1) | 20% |
| V-HHB-1 | (6-1) | 10% |
| 3-HHB-1 | (6-2) | 6% |
| 5-HBB(F)B-2 | (7-1) | 2% |

NI=78.7° C.; Tc≦−30° C.; Δn=0.121; Δ∈=3.9; γ1=60.3 mPa·s; Vth=2.07 V; VHR-1=99.7%; VHR-2=92.2%; τ=9.3 ms

Example 8

| | | |
|---|---|---|
| 2-BB(F)B-3 | (1) | 9% |
| 2-BB(F)B-5 | (1) | 9% |
| 3-BB(F)B-5 | (1) | 9% |
| 3-HB-CL | (2-1) | 6% |
| 3-BB(F,F)XB(F,F)-F | (3-3) | 22% |
| V-HH-3 | (5-1) | 15% |
| 1V-HH-3 | (5-1) | 10% |
| V-HHB-1 | (6-1) | 10% |
| V2-HHB-1 | (6-1) | 10% |

NI=78.8° C.; Tc≦−30° C.; Δn=0.135; Δ∈=4.3; γ1=63.9 mPa·s; Vth=2.24 V; VHR-1=99.7%; VHR-2=99.1%; τ=8.2 ms

Example 9

| | | |
|---|---|---|
| 2-BB(F)B-3 | (1) | 8% |
| 2-BB(F)B-5 | (1) | 8% |
| 3-BB(F)B-5 | (1) | 8% |
| 3-HB-CL | (2-1) | 5% |
| 3-BB(F,F)XB(F,F)-F | (3-3) | 22% |
| 3-HHXB(F,F)-F | (3-6) | 8% |
| V-HH-3 | (5-1) | 15% |
| 1V-HH-3 | (5-1) | 8% |
| V-HHB-1 | (6-1) | 9% |
| V2-HHB-1 | (6-1) | 9% |

NI=79.0° C.; Tc≦−30° C.; Δn=0.131; Δ∈=5.2; γ1=65.9 mPa·s; Vth=2.08 V; VHR-1=99.6%; VHR-2=92.0%; τ=8.3 ms

Example 10

| | | |
|---|---|---|
| 2-BB(F)B-3 | (1) | 8% |
| 3-HB-CL | (2-1) | 4% |
| 3-BB(F,F)XB(F,F)-F | (3-3) | 28% |
| 3-HHXB(F,F)-F | (3-6) | 8% |
| V-HH-3 | (5-1) | 11% |
| 1V-HH-3 | (5-1) | 11% |
| V-HHB-1 | (6-1) | 13% |
| V2-HHB-1 | (6-1) | 13% |
| 3-HHB-1 | (6-2) | 4% |

NI=80.4° C.; Tc≦−30° C.; Δn=0.112; Δ∈=6.4; γ1=65.4 mPa·s; Vth=1.78 V; VHR-1=99.7%; VHR-2=91.9%; τ=8.5 ms

Example 11

| | | |
|---|---|---|
| 2-BB(F)B-3 | (1) | 9% |
| 2-BB(F)B-5 | (1) | 4% |
| 3-BB(F,F)XB(F,F)-F | (3-3) | 22% |
| 3-HBB(F,F)-F | (3-5) | 10% |
| 3-HHBB(F,F)-F | (4-1) | 6% |
| V-HH-3 | (5-1) | 32% |
| V-HHB-1 | (6-1) | 13% |
| V2-HHB-1 | (6-1) | 4% |

NI=79.3° C.; Tc≦−30° C.; Δn=0.111; Δ∈=5.7; γ1=57.2 mPa·s; Vth=1.73 V; VHR-1=99.5%; VHR-2=92.3%; τ=8.1 ms

Example 12

| | | |
|---|---|---|
| 2-BB(F)B-5 | (1) | 4% |
| 3-BB(F)B-4 | (1) | 4% |
| 3-HB-CL | (2-1) | 21% |
| 2-HBB-F | (3-1) | 7% |
| 3-HBB-F | (3-1) | 7% |
| 5-HBB-F | (3-1) | 7% |
| 2-HHB-CL | (3-2) | 7% |
| 3-HHB-CL | (3-2) | 7% |
| 5-HHB-CL | (3-2) | 5% |
| 3-BB(F,F)XB(F,F)-F | (3-3) | 10% |
| 3-HH-4 | (5-2) | 21% |

NI=79.3° C.; Tc≦−20° C.; Δn=0.113; Δ∈=3.8; γ1=63.1 mPa·s; Vth=2.10 V; VHR-1=99.6%; VHR-2=92.2%; τ=10.6 ms

Example 13

| | | |
|---|---|---|
| 2-BB(F)B-5 | (1) | 6% |
| 3-BB(F)B-4 | (1) | 6% |
| 3-BB(F)B-5 | (1) | 7% |
| 3-HB-CL | (2-1) | 13% |
| 2-HBB-F | (3-1) | 6% |
| 3-HBB-F | (3-1) | 6% |
| 5-HBB-F | (3-1) | 6% |
| 3-BB(F,F)XB(F,F)-F | (3-3) | 10% |
| 3-HBB(F,F)-F | (3-4) | 10% |
| V-HH-3 | (5-1) | 20% |
| 3-HHB-1 | (6-2) | 3% |
| 5-HBB(F)B-2 | (7-1) | 7% |

NI=84.1° C.; Tc≦−30° C.; Δn=0.140; Δε=4.0; γ1=73.3 mPa·s; Vth=2.23 V; VHR-1=99.7%; VHR-2=92.3%; τ=9.0 ms

Example 14

| | | |
|---|---|---|
| 2-BB(F)B-5 | (1) | 6% |
| 2-BB(F)B-3 | (1) | 4% |
| 3-HB-CL | (2-1) | 8% |
| 5-HEB-F | (2-3) | 2% |
| 5-H2B(F)-F | (2-5) | 2% |
| 5-HXB(F,F)-F | (2-8) | 2% |
| 2-HBB-F | (3-1) | 5% |
| 3-HBB-F | (3-1) | 5% |
| 5-HBB-F | (3-1) | 5% |
| 3-BB(F,F)XB(F,F)-F | (3-3) | 10% |
| 3-HBB(F,F)-F | (3-4) | 10% |
| V-HH-3 | (5-1) | 16% |
| VFF-HH-3 | (5-3) | 2% |
| 3-HB-O2 | (5-6) | 2% |
| V-HHB-1 | (6-1) | 10% |
| 3-HHB-O1 | (6-3) | 2% |
| VFF-HHB-1 | (6-4) | 2% |
| V-HBB-1 | (6-7) | 3% |
| 3-HHEH-3 | (6-8) | 2% |
| 1O1-HBBH-3 | (7-4) | 2% |

NI=78.8° C.; Tc≦−30° C.; Δn=0.117; Δε=3.9; γ1=61.5 mPa·s; Vth=2.04 V; VHR-1=99.5%; VHR-2=92.1%; τ=9.8 ms

Example 15

| | | |
|---|---|---|
| 2-BB(F)B-5 | (1) | 6% |
| 3-BB(F)B-4 | (1) | 6% |
| 3-BB(F)B-5 | (1) | 7% |
| 3-HB-CL | (2-1) | 13% |
| 2-HBB-F | (3-1) | 6% |
| 3-HBB-F | (3-1) | 6% |
| 5-HBB-F | (3-1) | 6% |
| 3-BB(F,F)XB(F,F)-F | (3-3) | 10% |
| 3-HH2B(F,F)-F | (3-29) | 2% |
| 3-H2GB(F,F)-F | (3-32) | 2% |
| 3-HHEB(F,F)-F | (3-34) | 2% |
| 3-HB(F)B(F,F)-F | (3-35) | 4% |
| V-HH-3 | (5-1) | 20% |
| 3-HHB-1 | (6-2) | 3% |
| 5-HBB(F)B-2 | (7-1) | 3% |
| 5-HB(F)BH-2 | (7-2) | 2% |
| 3-HHEBH-3 | (7-5) | 2% |

NI=85.5° C.; Tc≦−30° C.; Δn=0.132; Δε=4.1; γ1=72.8 mPa·s; Vth=2.19 V; VHR-1=99.7%; VHR-2=92.2%; τ=8.8 ms

Example 16

| | | |
|---|---|---|
| 2-BB(F)B-3 | (1) | 9% |
| 2-BB(F)B-5 | (1) | 4% |
| 3-BB(F,F)XB(F,F)-F | (3-3) | 22% |
| 3-HHB(F,F)-F | (3-5) | 4% |
| V-HHB(F)-F | (3-15) | 2% |
| 3-HHB(F)-OCF2H | (3-18) | 2% |
| 5-GHB(F,F)-F | (3-33) | 2% |
| 3-HH2BB(F,F)-F | (4-2) | 2% |

| | | |
|---|---|---|
| 3-BB(F)B(F)B(F,F)-F | (4-4) | 2% |
| 3-HBB(F,F)XB(F,F)-F | (4-5) | 2% |
| V-HH-3 | (5-1) | 32% |
| V-HHB-1 | (6-1) | 13% |
| V2-HHB-1 | (6-1) | 4% |

NI=76.8° C.; Tc≦−30° C.; Δn=0.114; Δε=6.2; γ1=63.3 mPa·s; Vth=1.68 V; VHR-1=99.7%; VHR-2=92.3%; τ=9.7 ms

Example 17

| | | |
|---|---|---|
| 2-BB(F)B-5 | (1) | 4% |
| 3-BB(F)B-4 | (1) | 4% |
| 3-HB-CL | (2-1) | 21% |
| 2-HBB-F | (3-1) | 7% |
| 3-HBB-F | (3-1) | 7% |
| 5-HBB-F | (3-1) | 7% |
| 2-HHB-CL | (3-2) | 6% |
| 3-HHB-CL | (3-2) | 6% |
| 5-HHB-CL | (3-2) | 5% |
| 3-BB(F,F)XB(F,F)-F | (3-3) | 10% |
| 3-HHB-OCF3 | (3-8) | 2% |
| 3-HH-4 | (5-2) | 21% |

NI=78.7° C.; Tc≦−30° C.; Δn=0.110; Δε=3.9; γ1=64.2 mPa·s; Vth=2.09 V; VHR-1=99.7%; VHR-2=92.5%; τ=10.9 ms

Example 18

| | | |
|---|---|---|
| 2-BB(F)B-5 | (1) | 4% |
| 3-BB(F)B-4 | (1) | 4% |
| 3-HB-CL | (2-1) | 21% |
| 2-HBB-F | (3-1) | 7% |
| 3-HBB-F | (3-1) | 7% |
| 5-HBB-F | (3-1) | 7% |
| 2-HHB-CL | (3-2) | 7% |
| 3-HHB-CL | (3-2) | 7% |
| 5-HHB-CL | (3-2) | 5% |
| 3-BB(F,F)XB(F,F)-F | (3-3) | 10% |
| 3-HH-4 | (5-2) | 19% |
| 1O1-HH-3 | (—) | 2% |

NI=79.0° C.; Tc≦−20° C.; Δn=0.113; Δε=3.8; γ1=63.8 mPa·s; Vth=2.12 V; VHR-1=99.7%; VHR-2=92.2%; τ=10.5 ms

Example 19

| | | |
|---|---|---|
| 2-BB(F)B-3 | (1) | 12% |
| 2-HBB-F | (3-1) | 4% |
| 3-HBB-F | (3-1) | 5% |
| 5-HBB-F | (3-1) | 5% |
| 3-BB(F,F)XB(F,F)-F | (3-3) | 20% |
| V-HH-3 | (5-1) | 40% |
| V-HHB-1 | (6-1) | 14% |

300 ppm of the compound of formula (10) where n is 1 was added to the composition. The characteristics of the composition thus obtained were as follows.

NI=70.0° C.; Tc≦−20° C.; Δn=0.109; Δ∈=3.9; γ1=43.2 mPa·s; Vth=1.91 V; VHR-1=99.5%; VHR-2=92.0%; τ=7.1 ms

Example 20

| 2-BB(F)B-3 | (1) | 13% |
| 3-HB-CL | (2-1) | 5% |
| 2-HBB-F | (3-1) | 4% |
| 3-HBB-F | (3-1) | 5% |
| 5-HBB-F | (3-1) | 5% |
| 3-BB(F,F)XB(F,F)-F | (3-3) | 17% |
| V-HH-3 | (5-1) | 37% |
| V-HHB-1 | (6-1) | 8% |
| V2-HHB-1 | (6-1) | 6% |

200 ppm of the compound of formula (10) where n is 7 was added to the composition. The characteristics of the composition thus obtained were as follows.

NI=70.0° C.; Tc≦−20° C.; Δn=0.110; Δ∈=3.5; γ1=44.0 mPa·s; Vth=2.00 V; VHR-1=99.7%; VHR-2=92.5%; τ=8.6 ms

What is claimed is:

1. A liquid crystal composition comprising at least one compound selected from a group of compounds represented by formula (1) as a first component, at least one compound selected from a group of compounds represented by formulae (2-1), (3-1) to (3-6) and (4-1) as a second component, and at least one compound selected from a group of compounds represented by formulae (5-1), (5-2), (6-1), (6-2) and (7-1) as a third component, having a positive dielectric anisotropy, and having a nematic phase:

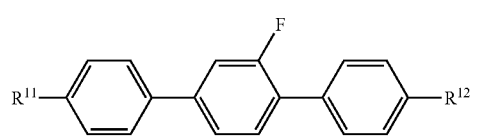
(1)

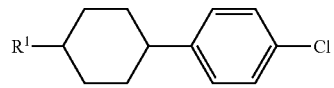
(2-1)

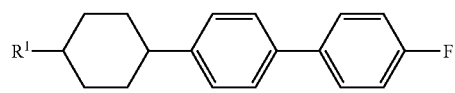
(3-1)

(3-2)

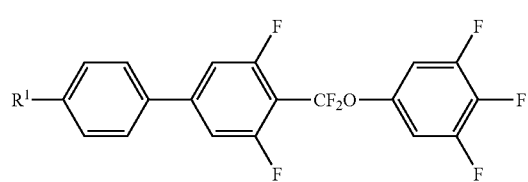
(3-3)

-continued

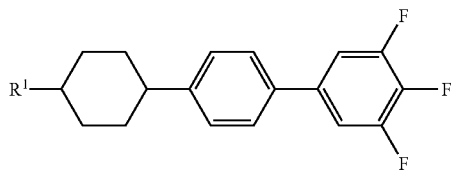
(3-4)

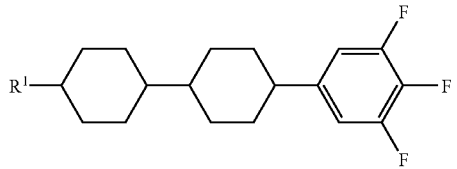
(3-5)

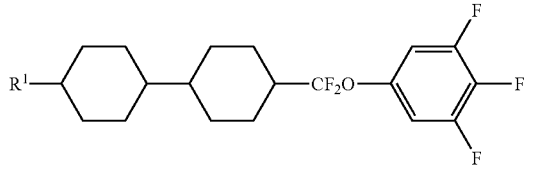
(3-6)

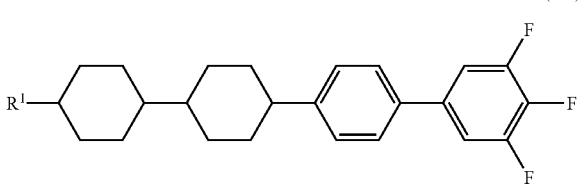
(4-1)

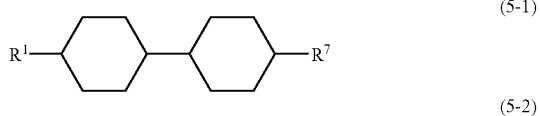
(5-1)

(5-2)

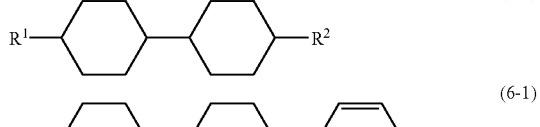
(6-1)

(6-2)

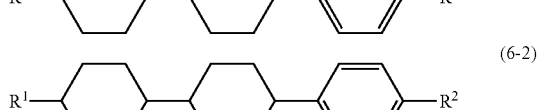
(7-1)

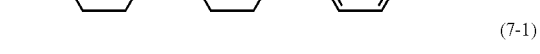

wherein $R^1$ and $R^2$ are independently alkyl; $R^7$ is alkenyl; and $R^{11}$ and $R^{12}$ are alkyls having different carbon numbers; and wherein the third component at least includes a compound selected from the group of compounds represented by formula (7-1).

2. The liquid crystal composition according to claim 1, wherein a ratio of the first component is in a range of approximately 3% by weight or more and less than approximately 10% by weight, a ratio of the second component is in a range of from approximately 10% to approximately 85% by weight, and a ratio of third component is in a range of from approximately 10% to approximately 80% by weight.

3. The liquid crystal composition according to claim 1, wherein a ratio of the first component is in a range of from approximately 10% to approximately 50% by weight, a ratio of the second component is in a range of from approximately 10% to approximately 85% by weight, and a ratio of third component is in a range of from approximately 10% to approximately 80% by weight.

4. The liquid crystal composition according to claim 1, wherein the composition has an optical anisotropy ranging from approximately 0.10 to approximately 0.15.

5. The liquid crystal composition according to claim 2, wherein the composition has an optical anisotropy ranging from approximately 0.10 to approximately 0.15.

6. The liquid crystal composition according to claim 3, wherein the composition has an optical anisotropy ranging from approximately 0.10 to approximately 0.15.

7. The liquid crystal composition according to claim 1, wherein the composition further comprises an antioxidant.

8. The liquid crystal composition according to claim 7, wherein the antioxidant is a compound represented by formula (10):

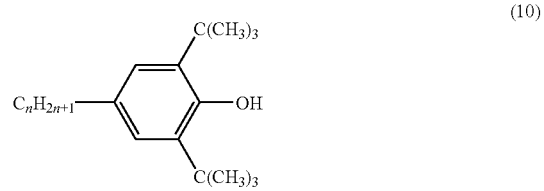

(10)

wherein n is an integer of 1 to 9.

9. A liquid crystal display element comprising the liquid crystal composition according to one of claim 1.

10. A liquid crystal display element comprising the liquid crystal composition according to one of claim 7.

* * * * *